(12) United States Patent
Kim et al.

(10) Patent No.: US 11,824,663 B2
(45) Date of Patent: Nov. 21, 2023

(54) ELECTRONIC DEVICE MANAGING COMMUNICATION BUFFER AND OPERATING METHOD THEREOF

(71) Applicant: Samsung Electronics Co., Ltd., Suwon-si (KR)

(72) Inventors: Dongho Kim, Suwon-si (KR); Jongmin Baik, Suwon-si (KR); Jusung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 194 days.

(21) Appl. No.: 17/519,818

(22) Filed: Nov. 5, 2021

(65) Prior Publication Data

US 2022/0116155 A1 Apr. 14, 2022

Related U.S. Application Data

(63) Continuation of application No. PCT/KR2021/013646, filed on Oct. 6, 2021.

(30) Foreign Application Priority Data

Oct. 8, 2020 (KR) ........................ 10-2020-0130581

(51) Int. Cl.
*H04L 1/1829* (2023.01)
*H04L 1/1812* (2023.01)
(Continued)

(52) U.S. Cl.
CPC ......... *H04L 1/1854* (2013.01); *H04B 17/309* (2015.01); *H04L 1/1812* (2013.01);
(Continued)

(58) Field of Classification Search
CPC ... H04L 1/1854; H04L 1/1812; H04L 1/1848; H04L 1/1874; H04L 1/1835; H04B 17/309; H04W 72/21
(Continued)

(56) References Cited

U.S. PATENT DOCUMENTS 10,039,149 B2   7/2018   Uchino et al.
10,091,687 B2   10/2018  Chen
(Continued)

FOREIGN PATENT DOCUMENTS

KR   10-2004-0093274   11/2004
KR   10-2008-0086399   9/2008
(Continued)

OTHER PUBLICATIONS

Irazabal et al., Dynamic Buffer Sizing and Pacing as Enablers of 5G Low-Latency Services. Mar. 2022, IEEE, vol. 21, No. 3, pp. 926-939. (Year: 2022).*
(Continued)

*Primary Examiner* — John J Tabone, Jr.
(74) *Attorney, Agent, or Firm* — Nixon & Vanderhye, P.C.

(57) ABSTRACT

Various embodiments of the disclosure relate to an apparatus and a method for managing a communication buffer of an electronic device in the electronic device. The electronic device includes: a wireless communication circuit, an application processor, and a communication processor operatively connected to the wireless communication circuit and the application processor and including a communication buffer, wherein the communication processor is configured to: identify a Radio Link Control (RLC) retransmission time, identify an uplink transmission rate, and configure a
(Continued)

size of an area for storing data in the communication buffer based on the RLC retransmission time and the uplink transmission rate.

20 Claims, 15 Drawing Sheets

(51) Int. Cl.
  *H04B 17/309* (2015.01)
  *H04L 1/1867* (2023.01)
  *H04W 72/21* (2023.01)
(52) U.S. Cl.
  CPC .......... *H04L 1/1835* (2013.01); *H04L 1/1848* (2013.01); *H04L 1/1874* (2013.01); *H04W 72/21* (2023.01)
(58) Field of Classification Search
  USPC ................................ 714/821; 375/372, 7.014
  See application file for complete search history.

(56) References Cited

U.S. PATENT DOCUMENTS

| | | | |
|---|---|---|---|
| 10,555,201 B2* | 2/2020 | Kim | H04L 1/1628 |
| 2009/0323607 A1 | 12/2009 | Park et al. | |
| 2012/0083264 A1* | 4/2012 | Ramasamy | H04W 52/262 455/425 |
| 2016/0088647 A1 | 3/2016 | Yi et al. | |
| 2019/0254115 A1* | 8/2019 | Baek | H04L 1/1874 |
| 2022/0116155 A1* | 4/2022 | Kim | H04L 1/1812 |

FOREIGN PATENT DOCUMENTS

| | | |
|---|---|---|
| KR | 10-2015-0129294 | 11/2015 |
| KR | 10-2264025 | 6/2021 |
| KR | 10-2021-0123835 | 10/2021 |

OTHER PUBLICATIONS

Kuma et al., Dynamic Control of RLC Buffer Size for Latency Minimization in Mobile RAN, 2018, IEEE, 1-6. (Year: 2018).*
International Search Report and Written Opinion dated Jan. 17, 2022 in counterpart International Patent Application No. PCT/KR2021/013646.
NTT Docomo, Inc., "Discussion on polling for empty buffer scenario," R2-1806033, 3GPP TSG RAN WG2 #101b, Sanya, China, Apr. 6, 2018.
Ericsson, "HARQ Buffer Flushing," R2-1808133, 3GPP TSG RAN WG2 #102, Busan, Korea, May 10, 2018.
Interdigital (Rapporteur), "Report on email discussion on [108#99][V2X] HARQ based TX side RLM/RLF", R2-2002074, 3GPP TSG RAN WG2 #109e, Feb. 19, 2020.
RFC 5681—TCP Congestion Control, Sep. 2009, 18 pages.
LTE: Evolved Universal Terrestrial Radio Access (E-UTRA); Medium Access Control (MAC) protocol specification (3GPP TS 36.321 version 15.9.0 Release 15), Jul. 2020, 137 pages.
LTE: Evolved Universal Terrestrial Radio Access (E-UTRA); Radio Link Control (RLC) protocol specification (3GPP TS 36.322 version 15.4.0 Release 15), Jul. 2020, 50 pages.

* cited by examiner

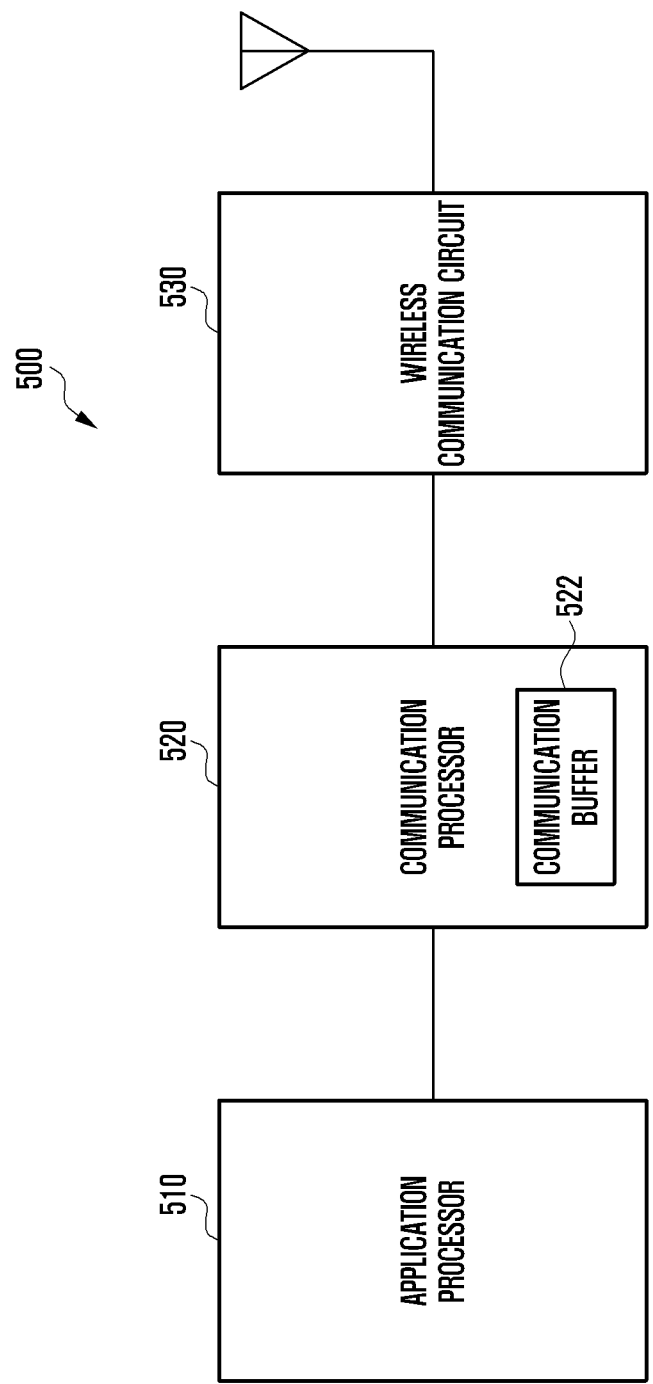

ELECTRONIC DEVICE MANAGING COMMUNICATION BUFFER AND OPERATING METHOD THEREOF

CROSS-REFERENCE TO RELATED APPLICATIONS

This application is a continuation of International Application No. PCT/KR2021/013646 designating the United States, filed on Oct. 6, 2021, in the Korean Intellectual Property Receiving Office and claiming priority to Korean Patent Application No. 10-2020-0130581, filed on Oct. 8, 2020, in the Korean Intellectual Property Office, the disclosures of which are incorporated by reference herein in their entireties.

BACKGROUND

Field

The disclosure relates to an apparatus and a method for managing a communication buffer of an electronic device in the electronic device.

Description of Related Art

Internet-based wired and/or wireless networks define a Transmission Control Protocol (TCP) for controlling data transmission. The transmission control protocol may be used to transmit data transmitted and/or received between nodes accessing the Internet in the packet form. For example, the transmission control protocol may operate as a protocol (for example, TCP/IP) of a transport layer for an Internet Protocol (IP) of a network layer.

The transmission control protocol may perform congestion control for adjusting a data transmission rate in consideration of a congestion state of the network. For example, when it is determined that the network is relatively congested, the transmission control protocol may control an uplink transmission rate of an electronic device (for example, transmission device) to be relatively low. The network congestion state may be estimated on the basis of a time (for example, Round Trip Time) spent until the transmission device transmits data (or packet) and receives a response signal (for example, ACK or NACK) corresponding to the data from a reception device.

An electronic device (for example, transmission device) may temporarily store data (or packet) to be transmitted to a network in a communication buffer of a communication processor. The electronic device may transmit information (for example, Buffer Status Report (BSR)) related to an amount of data stored in the communication buffer of the communication processor to the network. The network may allocate resources to be used by the electronic device for data transmission on the basis of the information related to the amount of data (or packet) stored in the communication buffer received from the electronic device.

The size of the communication buffer of the communication processor may be fixed. The electronic device may include the communication buffer of the communication processor configured be relatively larger to receive optimal resources from the network. For example, when the size of the communication buffer of the communication processor is configured to be relatively large, the electronic device may store relatively much data (or packet) in the communication buffer. Accordingly, the electronic device may receive relatively a large amount of resources from the network on the basis of relatively much data stored in the communication buffer.

When the size of the communication buffer of the communication processor is configured to be relatively large, the electronic device may have a transmission delay of data according to the size of the communication buffer. For example, when the communication buffer of the communication processor operates in a First In First Out (FIFO) scheme, new data (or packet) may be transmitted to the network only when data (or packet) stored in the communication buffer is transmitted to the network.

A transmission control protocol may run a time for determining a Round Trip Time (RTT) from a time point at which data (or packet) is scheduled in the kernel. Accordingly, the RTT measured by the transmission control protocol may be increased by a transmission delay of data due to the size of the communication buffer of the communication processor.

When the transmission delay of data by the size of the communication buffer of the communication processor is determined as a network congestion state, the transmission control protocol may excessively control the congestion compared to the actual network congestion state. The electronic device may have a problem in that an uplink transmission rate is rapidly decreased by the excessive congestion control by the transmission control protocol

SUMMARY

Embodiments of the disclosure provide an apparatus and a method for managing the communication buffer of the communication processor that influences the congestion control by the transmission control protocol in the electronic device.

According to various example embodiments, an electronic device includes: a wireless communication circuit, an application processor, and a communication processor operatively connected to the wireless communication circuit and the application processor and including a communication buffer, wherein the communication processor is configured to: identify a Radio Link Control (RLC) retransmission time, identify an uplink transmission rate, and configure a size of an area for storing data in the communication buffer based on the RLC retransmission time and the uplink transmission rate.

According to various example embodiments, a method of operating an electronic device includes: identifying a Radio Link Control (RLC) retransmission time by a communication processor including a communication buffer, identifying an uplink transmission rate, and configuring a size of an area for storing data in the communication buffer based on the RLC retransmission time and the uplink transmission rate.

According to various example embodiments of the disclosure, an electronic device (for example, transmission device) controls a size of a communication buffer of a communication processor on the basis of an uplink transmission rate and a Radio Link Control (RLC) retransmission time and thus reduce a transmission delay due to the communication buffer of the communication processor.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 5 is a block diagram illustrating an example configuration of an electronic device for configuring the size of a communication buffer of a communication processor according to various embodiments;

DETAILED DESCRIPTION

Hereinafter, various example embodiments will be described in greater detail with reference to the figures.

Figure 1:
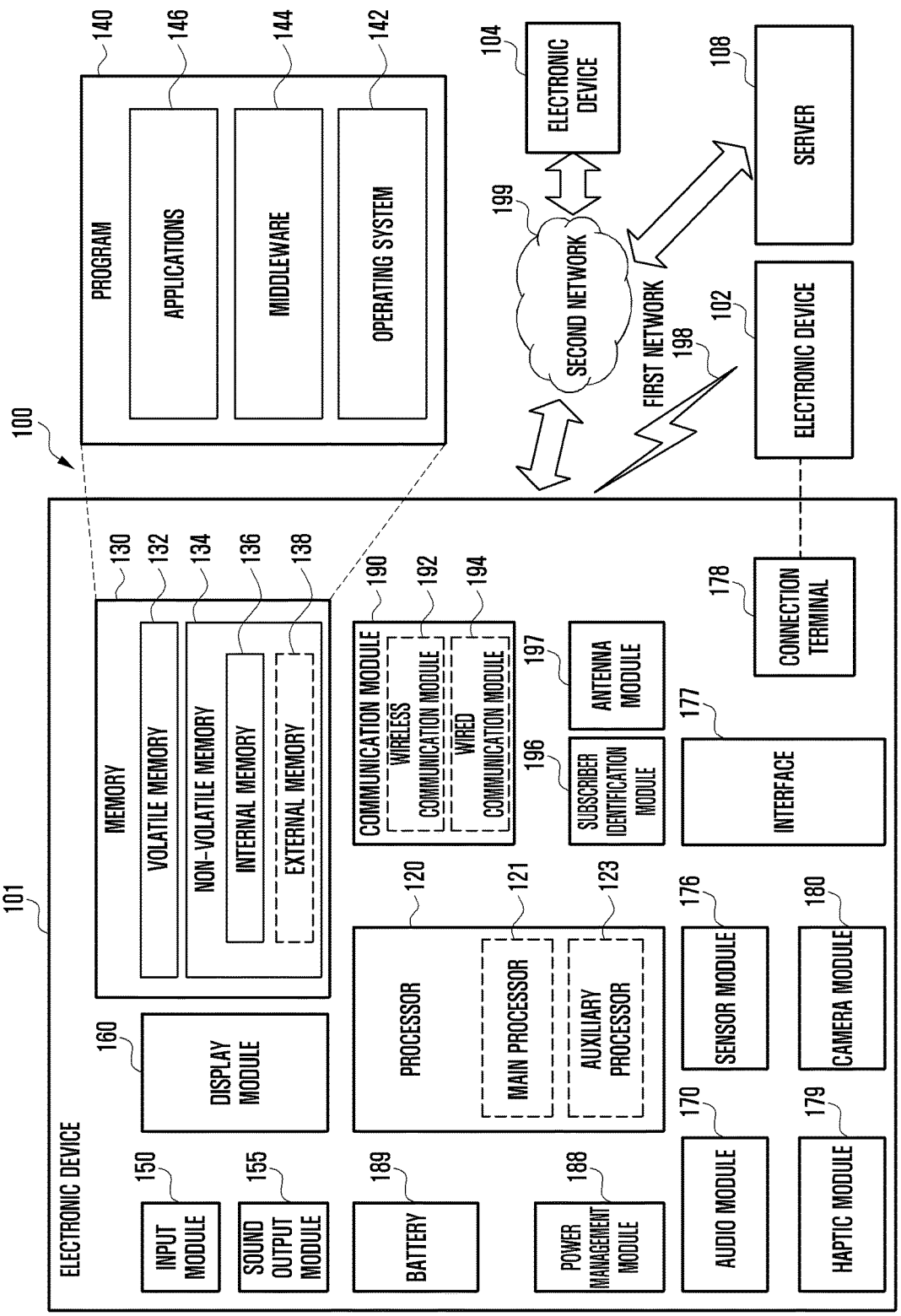
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beamforming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. According to an embodiment, the subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
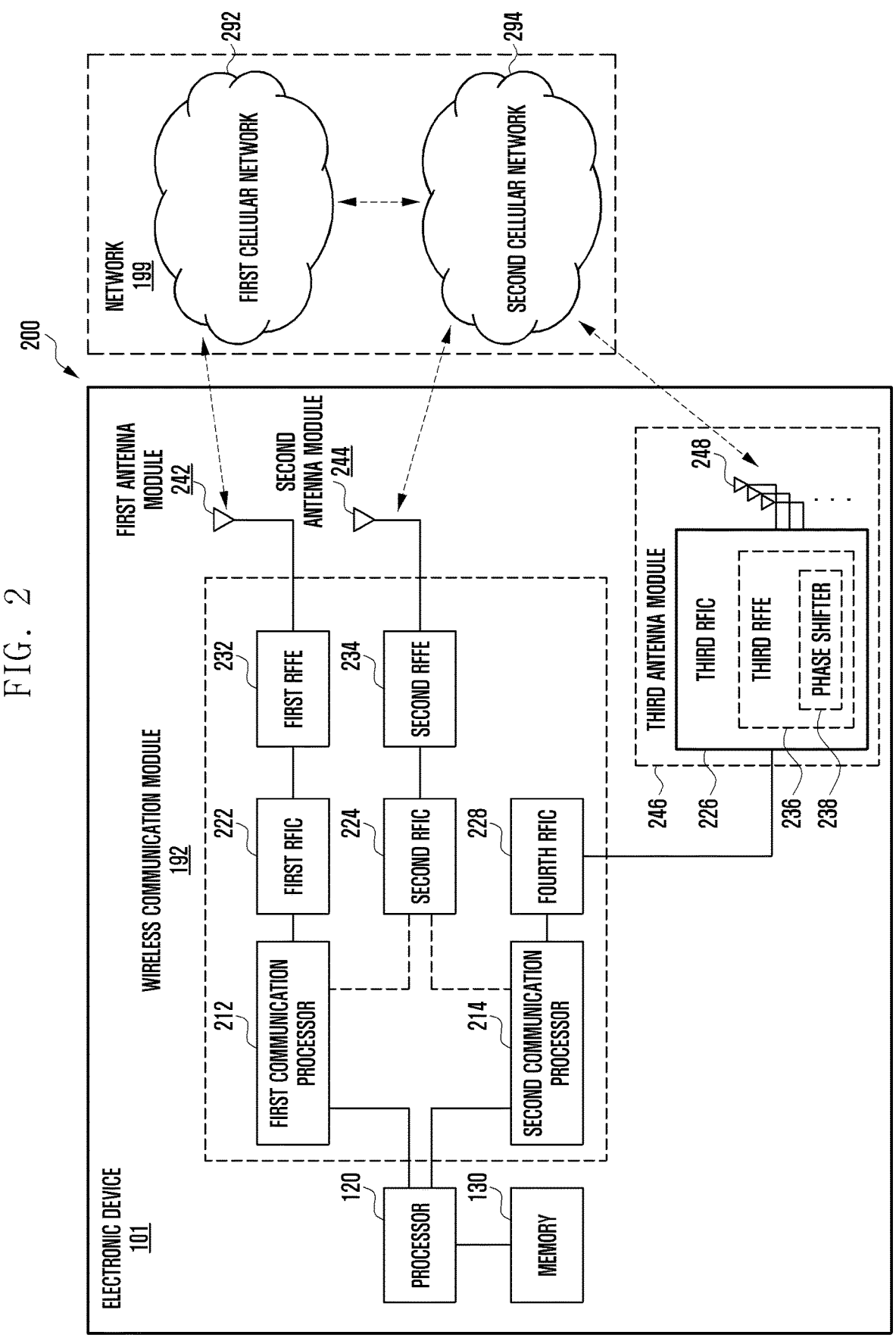
FIG. 2 is a block diagram illustrating an example configuration of an electronic device for supporting legacy network communication and 5G network communication according to various embodiments.

FIG. 2 is a block diagram 200 illustrating an example configuration of an electronic device 101 supporting legacy network communication and 5G network communication according to various embodiments.

Referring to FIG. 2, according to various embodiments, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may include the processor 120 and the memory 130. The network 199 may include a first network 292 and a second network 294. According to an embodiment, the electronic device 101 may further include at least one component among the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may be at least a part of the wireless communication module 192. According to an embodiment, the fourth RFIC 228 may be omitted, or may be included as a part of the third RFIC 226.

The first communication processor 212 may establish a communication channel of a band to be used for wireless communication with the first network 292, and may support legacy network communication via the established communication channel. According to an embodiment, the first network may be a legacy network including second generation (2G), third generation (3G), fourth generation (4G), or long-term evolution (LTE) network. The second communication processor 214 may establish a communication channel corresponding to a designated band (e.g., approximately 6 GHz to 60 GHz) among bands to be used for wireless communication with the second network 294, and may support 5G network communication via the established communication channel. According to an embodiment, the second network 294 may be a 5G network (e.g., new radio (NR)) defined in 3GPP. In addition, according to an embodiment, the first communication processor 212 or the second communication processor 214 may establish a communication channel corresponding to another designated band (e.g., approximately 6 GHz or less) among bands to be used for wireless communication with the second network 294, and may support 5G network communication via the established communication channel. According to an embodiment, the first communication processor 212 and the second communication processor 214 may be implemented in a single chip or a single package. According to an embodiment, the first communication processor 212 or the second communication processor 214 may be implemented in a single chip or a single package, together with the processor 120, the sub-processor 123, or the communication module 190.

According to an embodiment, the first communication processor 212 may perform data transmission or reception with the second communication processor 214. For example, data which has been classified to be transmitted via the second network 294 may be changed to be transmitted via the first network 292.

In this instance, the first communication processor 212 may receive transmission data from the second communication processor 214. For example, the first communication processor 212 may perform data transmission or reception with the second communication processor 214 via an inter-processor interface. The inter-processor interface may be implemented as, for example, a universal asynchronous receiver/transmitter (UART) (e.g., a high speed-UART (HS-UART)) or a peripheral component interconnect bus express (PCIe), but the type of interface is not limited thereto. For example, the first communication processor 212 and the second communication processor 214 may exchange control information and packet data information using, for example, a shared memory. For example, the first communication processor 212 may perform transmission or reception of various types of information such as sensing information, information associated with an output strength, and resource block (RB) allocation information, with the second communication processor 214.

Depending on implementation, the first communication processor 212 may not be directly connected to the second communication processor 214. In this instance, the first communication processor 212 may perform data transmission or reception with the second communication processor 214, via the processor 120 (e.g., an application processor). For example, the first communication processor 212 and the second communication processor 214 may perform data transmission or reception via the processor 120 (e.g., an application processor) and a HS-UART interface or a PCIe interface, but the type of interface is not limited. For example, the first communication processor 212 and the second communication processor 214 may exchange control information and packet data information using the processor 120 (e.g., an application processor) and a shared memory. According to an embodiment, the first communication processor 212 and the second communication processor 214 may be implemented in a single chip or a single package. According to various embodiments, the first communication processor 212 or the second communication processor 214 may be implemented in a single chip or a single package, together with the processor 120, the sub-processor 123, or the communication module 190.

In the case of transmission, the first RFIC 222 may convert a baseband signal generated by the first communication processor 212 into a radio frequency (RF) signal in the range of approximately 700 MHz to 3 GHz, which is used in the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal into a baseband signal so that the baseband signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) in an Sub6 band (e.g., approximately 6 GHz or less) used in the second network 294 (e.g., a 5G network). In the case of reception, a 5G Sub6 RF signal may be obtained from the second network 294 (e.g., a 5G network) via an antenna (e.g., the second antenna module 244), and may be preprocessed by an RFFE (e.g., the second RFFE 234). The second RFIC 224 may convert the preprocessed 5G Sub6 RF signal into a baseband signal so that the signal may be processed by a corresponding communication processor among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used in the second network 294 (e.g., a 5G network). In the case of reception, a 5G Above6 RF signal is obtained from the second network 294 (e.g., a 5G network) via an antenna (e.g., the antenna 248), and may be preprocessed by the third RFFE 236. The third RFIC 226 may convert the preprocessed 5G Above6 RF signal into a baseband signal so that the signal is processed by the second communication processor 214. According to an embodiment, the third RFFE 236 may be implemented as a part of the third RFIC 226.

According to an embodiment, the electronic device 101 may include the fourth RFIC 228, separately from or, as a part of, the third RFIC 226. In this instance, the fourth RFIC 228 may convert a baseband signal produced by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal into a 5G Above6 RF signal. In the case of reception, a 5G Above6 RF signal may be received from the second network 294 (e.g., a 5G network) via an antenna (e.g., the antenna 248), and may be converted into an IF signal by the third RFIC 226. The fourth RFIC 228 may convert the IF signal into a baseband signal so that the second communication processor 214 is capable of processing the baseband signal.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or single package. According to an embodiment, at least one of the first antenna module 242 or the second antenna module 244 may be omitted or may be combined with another antenna module, to process RF signals of a plurality of corresponding bands.

According to an embodiment, the third RFIC 226 and the antenna 248 may be disposed in the same substrate, and may form a third antenna module 246. For example, the wireless communication module 192 or the processor 120 may be disposed in a first substrate (e.g., a main PCB). In this instance, the third RFIC 226 is disposed in a part (e.g., a lower part) of a second substrate (e.g., a sub PCB) different from the first substrate, and the antenna 248 is disposed in another part (e.g., an upper part), so that the third antenna module 246 may be formed. By disposing the third RFIC 226 and the antenna 248 in the same substrate, the length of a transmission line therebetween may be reduced. For example, this may reduce a loss (e.g., a diminution) of a high-frequency band signal (e.g., approximately 6 GHz to 60 GHz) used for 5G network communication, the loss being caused by a transmission line. Accordingly, the electronic device 101 may improve the quality or speed of communication with the second network 294 (e.g., a 5G network).

According to an embodiment, the antenna 248 may be implemented as an antenna array including a plurality of antenna elements which may be used for beamforming. In this instance, the third RFIC 226, for example, may include a plurality of phase shifters 238 corresponding to a plurality of antenna elements, as a part of the third RFFE 236. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of a 5G Above6 RF signal received from the outside via a corresponding antenna element into the same or substantially the same phase. This may enable transmission or reception via beamforming between the electronic device 101 and the outside.

The second network 294 (e.g., a 5G network) may operate independently (e.g., Standalone (SA)) from the first network 292 (e.g., a legacy network), or may operate by being connected thereto (e.g., Non-Standalone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access the access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 130, and may be accessed by another component (e.g., the processor 120, the first communication processor 212, or the second communication processor 214).

Figure 3:
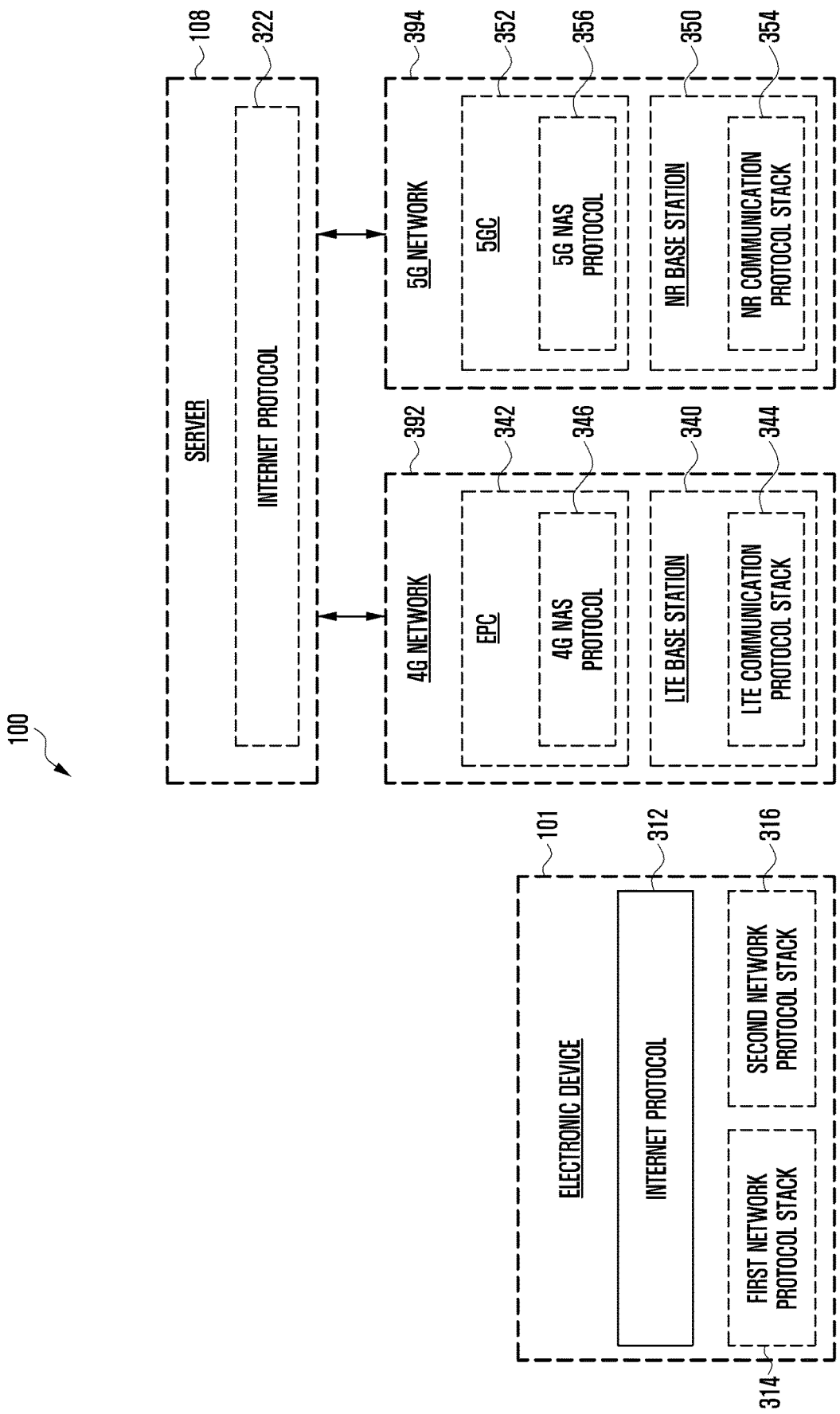
FIG. 3 is a diagram illustrating an example structure of a protocol stack of a 4G communication and/or a 5G communication network according to various embodiments.

FIG. 3 is a diagram illustrating an example protocol stack structure of a network 100 of 4G communication and/or 5G communication according to various embodiments.

Referring to FIG. 3, the network 100 according to various embodiments may include the electronic device 101, a 4G network 392, a 5G network 394, and the server 108.

According to various embodiments, the electronic device 101 may include an Internet protocol 312, a first communication protocol stack 314, and a second communication protocol stack 316. For example, the electronic device 101 may communicate with the server 108 via the 4G network 392 and/or 5G network 394.

According to an embodiment, the electronic device 101 may perform Internet communication associated with the server 108 using the Internet protocol 312 (e.g., a transmission control protocol (TCP), a user datagram protocol (UDP), or an internet protocol (IP)). For example, the Internet protocol 312 may be performed in a main processor (e.g., the main processor 121 of FIG. 1) included in the electronic device 101.

According to an embodiment, the electronic device 101 may perform wireless communication with the 4G network 392 using the first communication protocol stack 314. According to an embodiment, the electronic device 101 may perform wireless communication with the 5G network 394 using the second communication protocol stack 316. For example, the first communication protocol stack 314 and the second communication protocol stack 316 may be performed by one or more communication processors (e.g., the wireless communication module 192 of FIG. 1) included in the electronic device 101.

According to various embodiments, the server 108 may include the Internet protocol 322. The server 108 may perform transmission or reception of data related to the Internet protocol 322 with the electronic device 101 via the 4G network 392 and/or 5G network 394. According to an embodiment, the server 108 may include a cloud computing server existing outside the 4G network 392 or the 5G network 394. According to an embodiment, the server 108 may include an edge computing server (or a mobile edge computing (MEC) server) located inside at least one of the 4G network 392 or the 5G network 394.

According to various embodiments, the 4G network 392 may include a long-term evolution (LTE) base station 340 and an evolved packet core (EPC) 342. The LTE base station 340 may include an LTE communication protocol stack 344. The EPC 342 may include a legacy non-access stratum (NAS) protocol 346. The 4G network 392 may perform LTE wireless communication with the electronic device 101 using the LTE communication protocol stack 344 and the legacy NAS protocol 346.

According to various embodiment, the 5G network 394 may include a new radio (NR) base station 350 and a 5th generation core (5GC) 352. The NR base station 350 may include an NR communication protocol stack 354. The 5GC 352 may include a 5G NAS protocol 356. The 5G network 394 may perform NR wireless communication with the electronic device 101 using the NR communication protocol stack 354 and the 5G NAS protocol 356.

According to an embodiment, the first communication protocol stack 314, the second communication protocol stack 316, the LTE communication protocol stack 344, and the NR communication protocol stack 354 may include a control plane protocol for transmitting or receiving a control message and a user plane protocol for transmitting or receiving user data. For example, the control message may include a message related to at least one of security control, bearer setup, authentication, registration, or mobility management. For example, the user data may include, for example, the remaining data, excluding the control message.

According to an embodiment, the control plane protocol and the user plane protocol may include a physical (PHY) layer, a medium access control (MAC) layer, a radio link control (RLC) layer, or a packet data convergence protocol (PDCP) layer. For example, the PHY layer may perform channel coding and modulation of data received from a higher layer (e.g., the MAC layer), and transmit the same to a wireless channel, and may perform demodulation and decoding of data received via a wireless channel and transmit the same to a higher layer. The PHY layer included in the second communication protocol stack 316 and the NR communication protocol stack 354 may further perform an operation related to beamforming. For example, the MAC layer may logically/physically map data to a wireless channel to be transmitted or received, and may perform hybrid automatic repeat request (HARQ) for error correction. For example, the RLC layer may perform concatenation, segmentation, or reassembly of data, may identify the order of data, may perform reordering, and may perform redundancy check. For example, the PDCP layer may perform an operation of ciphering control data and user data, and an operation related to data integrity. The second communication protocol stack 316 and the NR communication protocol stack 354 may further include a service data adaptation protocol (SDAP). For example, the SDAP may manage wireless bearer allocation based on the quality of service (QoS) of user data.

According to various embodiments, the control plane protocol may include a radio resource control (RRC) layer and a non-access stratum (NAS) layer. For example, the RRC layer may process control data related to radio bearer setup, paging, or mobility management. For example, the NAS may process a control message related to authentication, registration, and mobility management.

According to various embodiments, the electronic device 101 may include a plurality of subscriber identification modules (eg, a first subscriber identification module and a second subscriber identification module), and subscriber information stored in each subscriber identification module (eg, an international mobile subscriber identifier) (IMSI)) may be used to communicate with the 4G network 392 and/or the 5G network 394.

According to various embodiments, the electronic device 101 may further include a third communication protocol stack (not shown) and a fourth communication protocol stack (not shown). Here, the third communication protocol stack corresponds to the first communication protocol stack 314, and may include various protocols for wireless communication with the 4G network 392, and the fourth communication protocol stack is corresponds to the second communication protocol stack 316 and may include various protocols for wireless communication with the 5G network 394.

According to various embodiments, when communicating using the first subscriber identification module, the electronic device 101 wirelessly communicates with the 4G network 392 using the first communication protocol stack 314 and 5G network 394 using the second communication protocol stack 316. In addition, when communicating using the second subscriber identification module, the electronic device wirelessly communicates with the 4G network 392 using the third communication protocol stack and the 5G network using the fourth communication protocol stack.

Figure 4A:
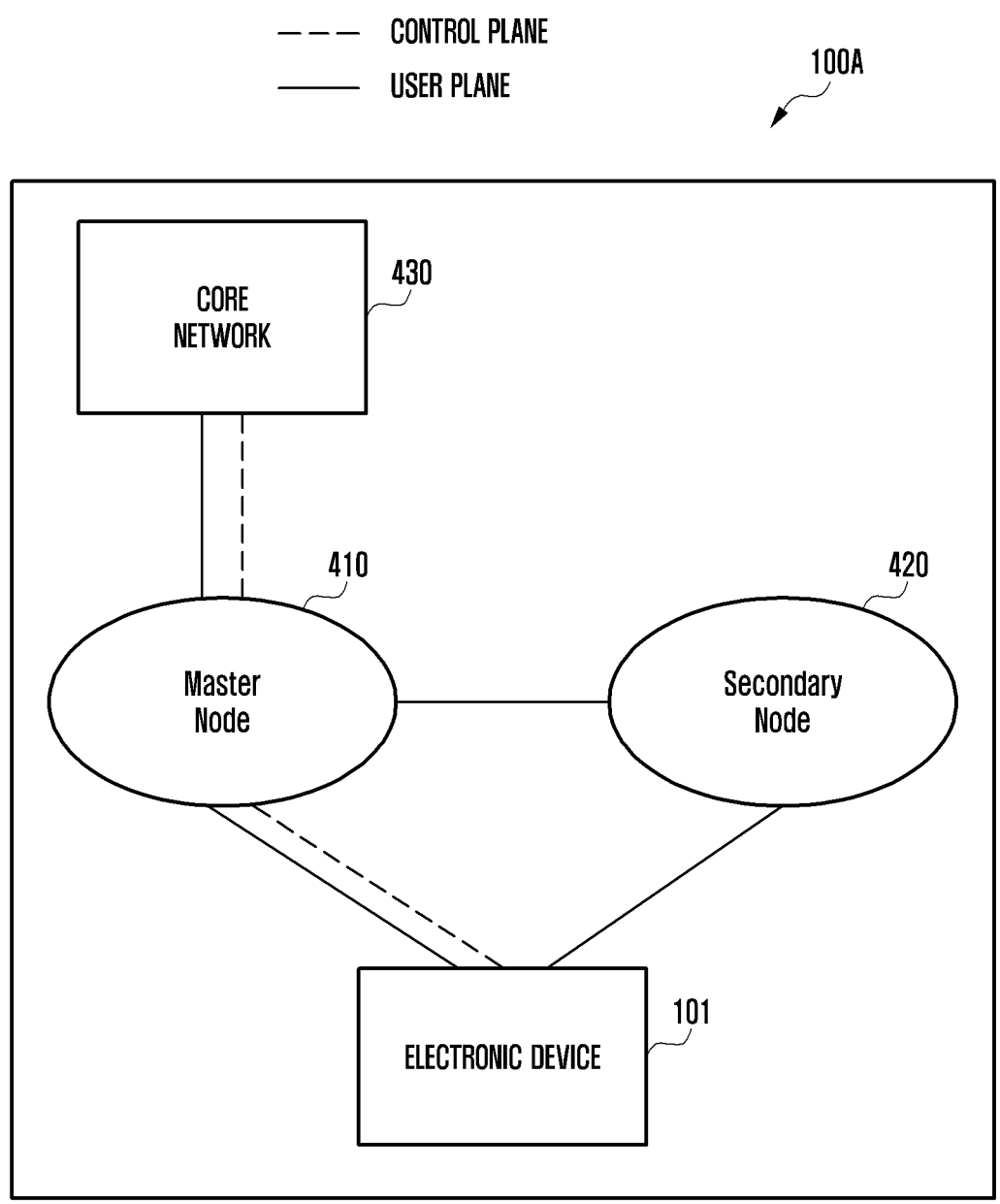
FIG. 4A, FIG. 4B, and FIG. 4C are diagrams illustrating wireless communication systems for providing a 4G communication and/or a 5G communication network according to various embodiments.
Figure 4B:
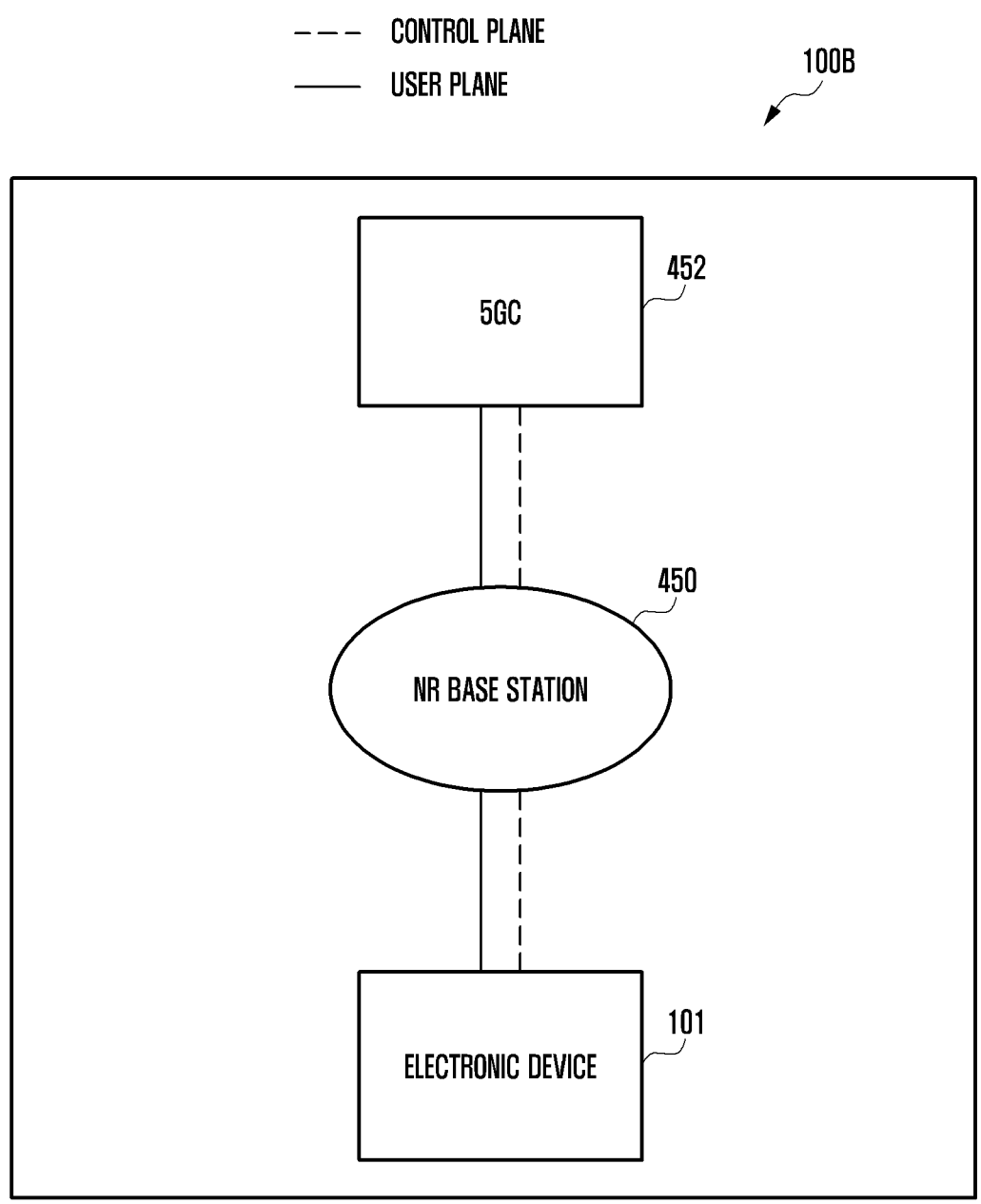
Figure 4C:
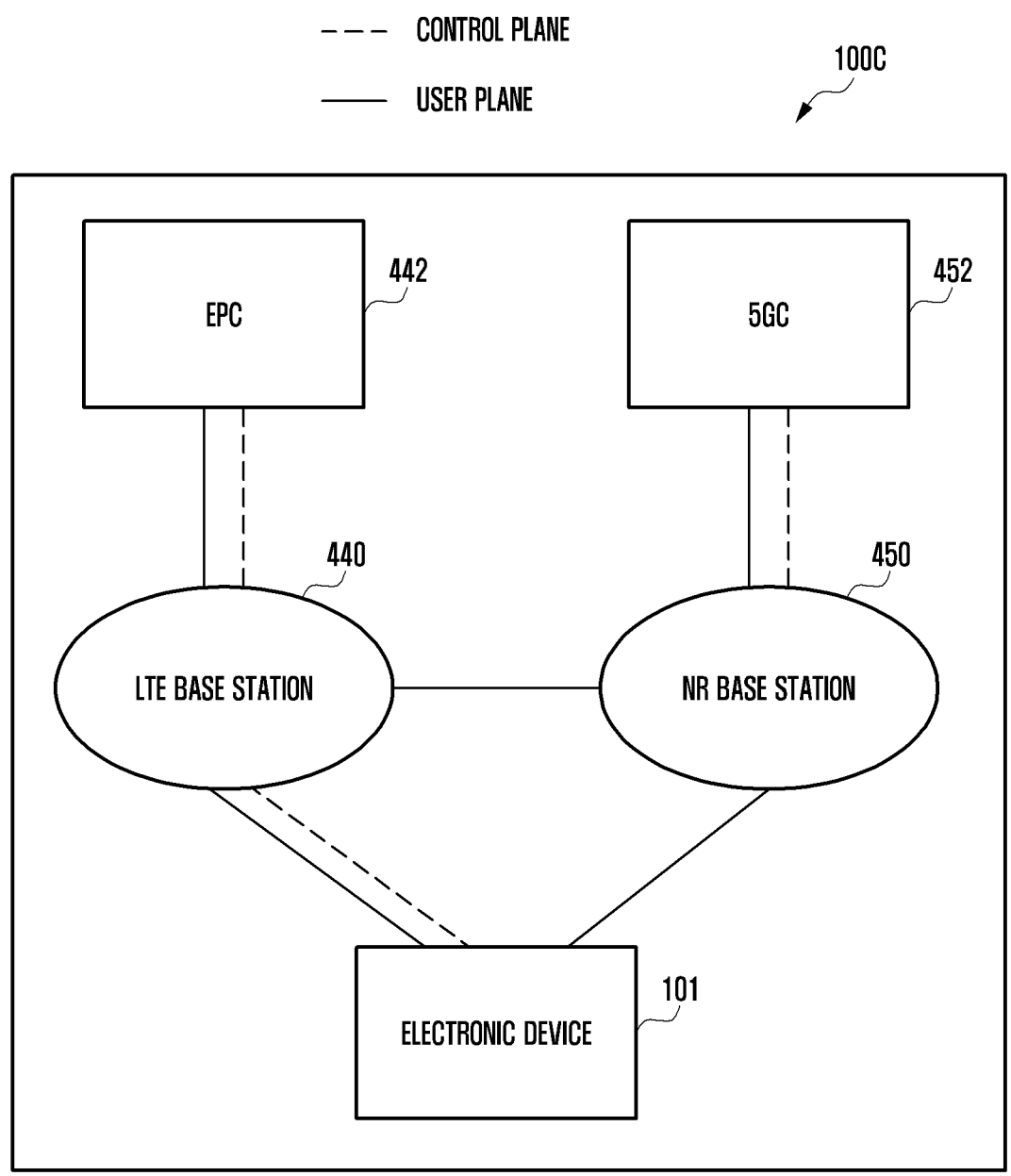

FIGS. 4A, 4B and 4C are diagrams illustrating example wireless communication systems providing a 4G (legacy) communication network and/or a 5G communication network according to various embodiments.

Referring to FIGS. 4A, 4B and 4C, network environments 100A to 100C may include at least one of a 4G network or a 5G network. The 4G network may include, for example, a 4G or LTE base station (e.g., eNodeB (eNB)) 440 of a 3GPP specification supporting a wireless connection with an electronic device 101 and an evolved packet core (EPC) 442 managing 4G communication. The 5G network may include, for example, a new radio (NR) base station (e.g., gNodeB (gNB)) 450 supporting a wireless connection with the electronic device 101 and a 5th generation core (5GC) 452 managing 5G communication of the electronic device 101.

According to various embodiments, the electronic device 101 may transmit and/or receive a control message and user data through 4G communication and/or 5G communication. The control message may include, for example, a message associated with at least one of security control, bearer setup, authentication, registration, or mobility management of the electronic device 101. The user data may refer to, for example, user data excluding the control message transmitted and received between the electronic device 101 and a core network 430 (e.g., the EPC 442 and/or the 5GC 452).

Referring to FIG. 4A, the electronic device 101 according to an embodiment may transmit and receive at least one of a control message or user data related with a second network (e.g., the 5G network or the 4G network) using at least a part (e.g., the LTE base station 440 and the EPC 442) of a first network (e.g., the 4G network or the 5G network).

According to various embodiments, a network environment 100A may include a network environment that provides multi-radio access technology (RAT) dual connectivity (MR-DC) to the LTE base station 440 and the NR base station 450 and enables transmission and reception of a control message to and from the electronic device 101 through one core network 430 of the EPC 442 or the 5GC 452.

According to various embodiments, one of the LTE base station 440 or the NR base station 450 may operate as a master node (MN) 410, and the other thereof may operate as a secondary node (SN) 420. The MN 410 may be connected to the core network 430 to transmit and receive a control message. The MN 410 and the SN 420 may be connected through a network interface to transmit and receive a message associated with radio resource (e.g., communication channel) management to and from each other.

According to various embodiments, the MN 410 may include the LTE base station 440, the SN 420 may include the NR base station 450, and the core network 430 may include the EPC 442. For example, a control message may be transmitted and/or received through the LTE base station 440, and user data may be transmitted and/or received through the LTE base station 440 and the NR base station 450.

According to various embodiments, the MN 410 may include the NR base station 450, the SN 420 may include the LTE base station 440, and the core network 430 may include the 5GC 452. For example, a control message may be transmitted and/or received through the NR base station 450, and user data may be transmitted and/or received through the LTE base station 440 and the NR base station 450.

Referring to 4B, according to various embodiments, the 5G network may transmit and receive a control message and user data independently of the electronic device 101.

Referring to 4C, the 4G network and the 5G network according to various embodiments may independently provide data transmission and/or reception. For example, the electronic device 101 and the EPC 442 may transmit and/or receive a control message and user data through the LTE base station 440. In another example, the electronic device 101 and the 5GC 452 may transmit and/or receive a control message and user data through the NR station 450.

According to various embodiments, the electronic device 101 may be registered in at least one of the EPC 442 or the 5GC 452 to transmit and receive a control message.

According to various embodiments, the EPC 442 or the 5GC 452 may interwork to manage communication of the electronic device 101. For example, movement information about the electronic device 101 may be transmitted and received through an interface (e.g., N26 interface) between the EPC 442 and the 5GC 452.

FIG. 5 is a block diagram illustrating an example configuration of an electronic device for configuring the size of a communication buffer of a communication processor according to various embodiments. According to an embodiment, an electronic device 500 of FIG. 5 may be at least partially similar to the electronic device 101 of FIG. 1, FIG. 2, FIG. 3, FIG. 4A, FIG. 4B, or FIG. 4C or may further include various embodiments of the electronic device.

Referring to FIG. 5, according to various embodiments, the electronic device 500 may include an Application Processor (AP) (e.g., including processing circuitry) 510, a Communication Processor (CP) (e.g., including processing circuitry) 520, and/or a wireless communication circuit 530. According to an embodiment, the application processor 510 and the communication processor 520 may be substantially the same as or similar to the processor 120 of FIG. 1 or may be included in the processor 120. For example, the application processor 510 may be substantially the same as the main processor 121 of FIG. 1 or may be included in the main processor 121. The communication processor 520 may be substantially the same as the auxiliary processor 123 or may be included in the auxiliary processor 123. According to an embodiment, the wireless communication circuit 530 may be substantially the same as the wireless communication module 192 of FIG. 1 or may be included in the wireless communication module 192.

According to various embodiments, the application processor 510 may include various processing circuitry and control transmission and/or reception of data through the communication processor 520 operatively connected thereto. According to an embodiment, the application processor 510 may transmit data (or packet), to be transmitted to the network, to the communication processor 520.

According to various embodiments, the communication processor 520 may operatively connected to the application processor 510 and/or the wireless communication circuit 530.

According to various embodiments, the communication processor 520 may include various processing circuitry and support at least one network communication. According to an embodiment, the communication processor 520 may include one communication processor or include a plurality of communication processors divided in hardware or software. For example, a plurality of communication processors (for example, the first communication processor 212 and the second communication processor 214 of FIG. 2) may support network communication related to different types of Radio Access Technologies (RATs).

According to various embodiments, a communication buffer 522 of the communication processor 520 may be included within the communication processor 520 or may, for example, be included in a memory included in the same package in which the communication processor 520 is included. For example, the communication buffer 522 may be included in a memory (for example, the volatile memory 132 of FIG. 1) or in a separate memory.

According to various embodiments, the communication processor 520 may control the wireless communication circuit 530 to transmit data (or packet) received from the application processor 510 to the network. According to an embodiment, the communication processor 520 may store the data (or packet) received from the application processor 510 to the communication buffer 522. The communication processor 520 may control the wireless communication circuit 530 to transmit information (for example, a Buffer Status Report (BSR)) related to an amount of the data stored in the communication buffer 522 to the network. The communication processor 520 may control the wireless communication circuit 530 to transmit the data stored in the communication buffer 522 to the network through resources allocated by the network on the basis of the information related to the amount of data stored in the communication buffer 522.

According to various embodiments, the communication processor 520 may configure the size of the communication buffer 522 on the basis of an uplink transmission rate of the electronic device 500 and a Radio Link Control (RLC) retransmission time. According to an embodiment, the size of the communication buffer 522 may, for example, be the size of an area which can be used for storing data in the communication buffer 522 and may be configured on the basis of an upper limit reference (for example, high watermark) of the communication buffer 522 configured on the basis of the uplink transmission rate (uplink throughput) and the RLC retransmission time. For example, the upper limit reference of the communication buffer 522 may be configured as a value larger than the size of data that can be transmitted for a unit time (for example, RLC retransmission time) on the basis of the uplink transmission rate of the electronic device 500. For example, the upper limit reference of the communication buffer 522 may be up-controlled on the basis of an increase in the uplink transmission rate of the electronic device 500. For example, the RLC retransmission time may be identified on the basis of "t-PollRetransmit" included in an information element "RLC-config" of an RRC control message (for example, RRCConnectionReconfiguration) received from the network. For example, the RLC retransmission time may include information related to a minimum time to receive a response (for example, ACK or NACK) corresponding to the data transmitted from the electronic device 500 from the network. For example, the uplink transmission rate of the electronic device 500 may be acquired on the basis of the number of Protocol Data Units (PDUs) and/or the size of PDUs transmitted for a specified time for each layer of the electronic device 500 (for example, Open System Interconnection (OSI) 7 layers or TCP/IP 5 layers).

According to an embodiment, when the amount of data stored in the communication buffer 522 meets the upper limit reference of the communication buffer 522, the communication processor 520 may transmit data transmission suspend information to the application processor 510. For example, the application processor 510 may suspend data transmission to the communication processor 520 on the basis of the data transmission suspend information. When data transmission to the communication processor 520 is suspended, the application processor 510 may store data to be transmitted to the communication processor 520 in a memory (for example, a shared memory). For example, meeting the upper limit reference may include the state in which the amount of data stored in the communication buffer 522 is larger than or equal to a value configured as the upper limit reference.

According to various embodiments, the communication processor 520 may configure a lower limit reference (e.g., low watermark) of the communication buffer 522 on the basis of an uplink transmission rate of the electronic device 500 and an RLC retransmission time. According to an embodiment, the lower limit reference of the communication buffer 522 may be configured as the size of data that can be transmitted for a unit time (for example, RLC retransmission time) on the basis of the uplink transmission rate of the electronic device 500. According to an embodiment, the lower limit reference of the communication buffer 522 may be configured such that data transmission is resumed at a time point at which a half of the RLC retransmission time passes from a time point at which the data transmission from the application processor 510 to the communication processor 520 is suspended on the basis of the upper limit reference of the communication buffer 522.

According to an embodiment, when the data transmission from the application processor 510 to the communication processor 520 is suspended on the basis of the upper limit reference of the communication buffer 522, the communication processor 520 may identify whether the amount of data stored in the communication buffer 522 meets the lower limit reference of the communication buffer 522. When the amount of data stored in the communication buffer 522 meets the lower limit reference of the communication buffer 522, the communication processor 520 may transmit data transmission resume information to the application processor 510. For example, the application processor 510 may resume the data transmission to the communication processor 520 on the basis of the data transmission resume information. When the data transmission to the communication processor 520 is resumed, the application processor 510 may transmit data stored in a memory (for example, shared memory) to the communication processor 520. For example, meeting the lower limit reference may include the state in which the amount of data stored in the communication buffer 522 is substantially the same as a value configured as the lower limit reference.

According to various embodiments, the communication processor 520 may update the upper limit reference and/or the lower limit reference of the communication buffer 522 on the basis of a compensation value. According to an embodiment, the compensation value may be selected in a predefined compensation value table on the basis of the uplink transmission rate of the electronic device 500 and/or the RLC retransmission time. According to an embodiment, the compensation value may be configured on the basis of an amount of data (or packet) flowing in a network stack (for example, the operating system 142 of FIG. 1) of the kernel of the application processor 510.

According to various embodiments, when the electronic device 500 supports dual connectivity, the communication processor 520 may configure the RLC retransmission time on the basis of an amount of data to be transmitted through the uplink. According to an embodiment, when the amount of data stored in the communication buffer 522 meets a specified first condition, the communication processor 520 may transmit data through first wireless communication with an MN (for example, the MN 410 of FIG. 4A) and second wireless communication with an SN (for example, the SN 420 of FIG. 4A). In this case, the communication processor 520 may configure an RLC retransmission time configured to be relatively longer among an RLC retransmission time with the MN and an RLC retransmission time with the SN as a reference RLC retransmission time to be used for configuring the size of the communication buffer 522. For example, meeting the specified first condition may include the state in which the amount of data stored in the communication buffer 522 is larger than or equal to "ul-DataSplit-Threshold" of "PDCP config". According to an embodiment, when the amount of data stored in the communication buffer 522 does not meet the specified first condition, the communication processor 520 may transmit data through the first wireless communication with the MN (for example, the MN 410 of FIG. 4A). In this case, the communication processor 520 may configure the RLC retransmission time with the MN as the reference RLC retransmission time to be used for configuring the size of the communication buffer 522. For example, the state in which the specified first condition is not met may include the state in which the amount of data stored in the communication buffer 522 is less than "ul-DataSplit-Threshold" of "PDCP config".

According to various embodiments, the communication processor 520 may control data transmission by the application processor 510 to be suspended on the basis of a transmission rate with the application processor 510. According to an embodiment, when the transmission rate with the application processor 510 meets a specified second condition, the communication processor 520 may transmit data transmission suspend information to the application processor 510. For example, meeting the specified second condition may include that state in which the transmission rate with the application processor 510 exceeds the uplink transmission rate of the electronic device 500. For example, the transmission rate with the application processor 510 may include a rate at which the communication processor 520 receives data from the application processor 510. For example, the uplink transmission rate of the electronic device 500 may include a rate at which the electronic device 500 (or the communication processor 520) transmits data to the network. For example, the application processor 510 may suspend data transmission to the communication processor 520 on the basis of data transmission suspend information.

According to various embodiments, when data transmission from the application processor 510 to the communication processor 520 is suspended, the communication processor 520 may control the application processor 510 to resume the data transmission on the basis of a data occupancy rate of an RLC buffer. According to an embodiment, when the data transmission from the application processor 510 to the communication processor 520 is suspended, the communication processor 520 may identify the data occupancy rate of the RLC buffer. When the data occupancy rate of the RLC buffer meets a specified third condition, the communication processor 520 may transmit data transmission resume information to the application processor 510. For example, the data occupancy rate of the RLC buffer may include an average of data occupancy rates of the RLC buffer detected for a reference time or a reference number of times or a standard deviation of data occupancy rates of the RLC buffer. For example, meeting the specified third condition may include that state in which the data occupancy rate of the RLC buffer becomes relatively low. In another example, meeting the specified third condition may include that state in which the standard deviation of the data occupancy rates of the RLC buffer is relatively large. For example, the RLC buffer may include a transmission buffer for temporarily storing transmission data in an RLC layer.

According to various embodiments, the wireless communication circuit 530 may receive a signal from the outside (for example, the LTE eNB 440 and/or the NR gNB 450 of FIG. 4C) or transmit a signal to the outside through an antenna (not shown). According to an embodiment, the wireless communication circuit 530 may include a first communication circuit and a second communication circuit. For example, the first communication circuit may include a first RFIC (for example, the first RFIC 222 of FIG. 2) and a first RFFE (for example, the first RFFE 232 of FIG. 2) for communication with a first node (for example, the first node 410 of FIG. 4A) of the first wireless network. For example, the second communication circuit may include a second RFIC (for example, the third RFIC 226 of FIG. 2) and a second RFFE (for example, the third RFFE 236 of FIG. 2) for communication with a second node (for example, the second node 420 of FIG. 4A) of the second wireless network.

According to various example embodiments, an electronic device (for example, the electronic device 101 of FIG. 1, FIG. 2, FIG. 3, FIG. 4A, FIG. 4B, or FIG. 4C or the electronic device 500 of FIG. 5) may include: a wireless communication circuit (for example, the wireless communication module 192 of FIG. 1 or the wireless communication circuit 530 of FIG. 5), an application processor (for example, the main processor 121 of FIG. 1 or the application processor 510 of FIG. 5), and a communication processor (for example, the auxiliary processor 123 of FIG. 1 or the communication processor 520 of FIG. 5) operatively connected to the wireless communication circuit and the application processor and including a communication buffer (for example, the communication buffer 522 of FIG. 5), wherein the communication processor may be configured to: identify a Radio Link Control (RLC) retransmission time, identify an uplink transmission rate, and configure a size of an area for storing data in the communication buffer based on the RLC retransmission time and the uplink transmission rate.

According to various example embodiments, the communication processor may be configured to acquire the RLC retransmission time from a Radio Resource Control (RRC) control message.

According to various example embodiments, the communication processor may be configured to: identify a size of uplink data when dual connectivity of first wireless communication and second wireless communication is supported, identify a first RLC retransmission time of the first wireless communication and a second RLC retransmission time of the second wireless communication based on the size of the uplink data meeting a specified first condition, and select a value larger among the first RLC retransmission time and the second RLC retransmission time as a reference RLC retransmission time.

According to various example embodiments, the communication processor may be configured to: configure the size of the area for storing the data in the communication buffer based on the reference RLC retransmission time and the uplink transmission rate.

According to various example embodiments, the communication processor may be configured to: estimate the uplink transmission rate based on a number of Protocol Data Units (PDUs) transmitted through an uplink for a specified time and a size of PDUs.

According to various example embodiments, the communication processor may be configured to: configure at least one of an upper limit reference or a lower limit reference of the communication buffer based on the RLC retransmission time and the uplink transmission rate.

According to various example embodiments, the communication processor may be configured to: transmit information on data transmission suspend to the application processor based on an amount of data stored in the communication buffer meeting the upper limit reference.

According to various example embodiments, the communication processor may be configured to: identify a data reception rate from the application processor based on the amount of data stored in the communication buffer not meeting the upper limit reference, and transmit the information on the data transmission suspend to the application processor based on the data reception rate meeting a second condition.

According to various example embodiments, the communication processor may be configured to: transmit information related to data transmission resume to the application processor based on an amount of data stored in the communication buffer meeting the lower limit reference in the state in which data transmission of the application processor is suspended.

According to various example embodiments, the communication processor may be configured to: identify a data occupancy rate of an RLC buffer based on the amount of data stored in the communication buffer not meeting the lower limit reference in a state in which data transmission by the application process is suspended, and transmit the information related to the data transmission resume to the application processor based on the data occupancy rate of the RLC buffer meeting a specified third condition.

Figure 6:
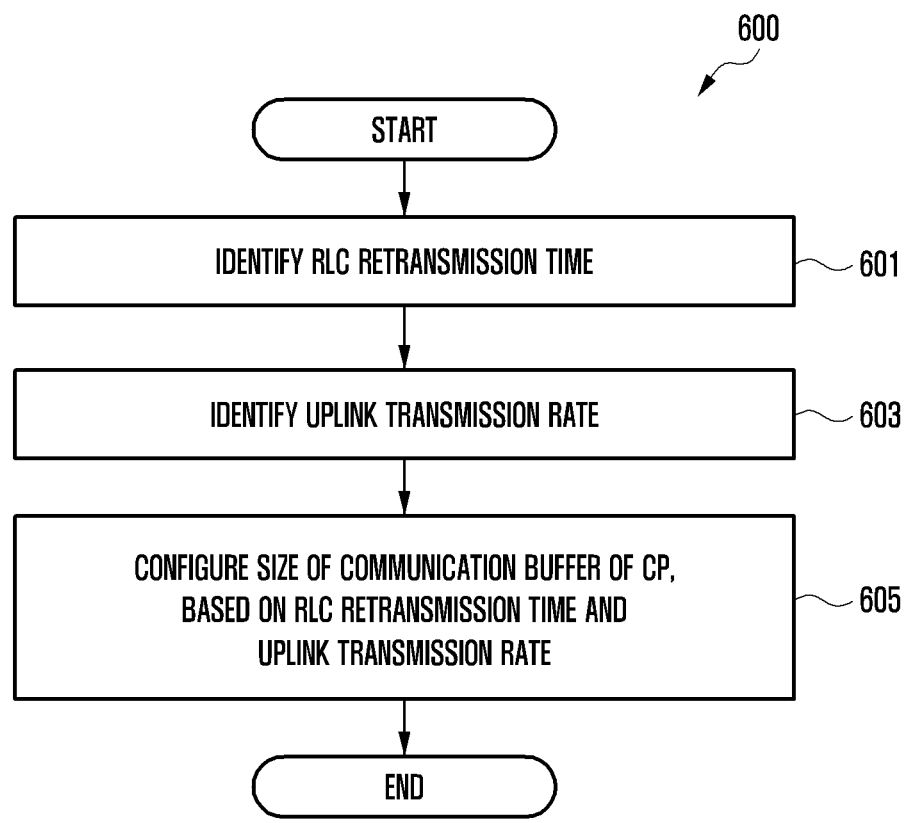
FIG. 6 is a flowchart illustrating an example process in which an electronic device configures the size of a communication buffer of a communication processor according to various embodiments.

FIG. 6 is a flowchart 600 illustrating an example process in which an electronic device configures the size of a communication buffer of a communication processor according to various embodiments. In the following embodiments, operations may be sequentially performed but the sequential performance is not necessary. For example, orders of the operations may be changed, and at least two operations may be performed in parallel. For example, the electronic device of FIG. 6 may include the electronic device 101 of FIG. 1, FIG. 2, FIG. 3, FIG. 4A, FIG. 4B, or FIG. 4C or the electronic device 500 of FIG. 5.

Referring to FIG. 6, according to various embodiments, the electronic device (for example, the processor 120 of FIG. 1 or the communication processor 520 of FIG. 5) may identify the RLC retransmission time in operation 601. According to an embodiment, the communication processor 520 may identify the RLC retransmission time on the basis of "t-PollRetransmit" included in an information element "RLC-config" of an RRC control message (for example, RRCConnectionReconfiguration) received from the network as shown in [Table 1] (for example, 3GPP TS 36.331 standard).

TABLE 1

| | |
|---|---|
| RLC-Config ::= | CHOICE { |
| am | |
| SEQUENCE { | |
| ul-AM-RLC | |
| UL-AM-RLC, | |
| dl-AM-RLC | |
| DL-AM-RLC | |
| }, | |
| um-Bi-Directional | SEQUENCE { |
| ul-UM-RLC | |
| UL-UM-RLC, | |
| dl-UM-RLC | |
| DL-UM-RLC | |
| }, | |
| um-Uni-Directional-UL | SEQUENCE { |
| ul-UM-RLC | |
| UL-UM-RLC | |
| }, | |
| um-Uni-Directional-DL | SEQUENCE { |
| dl-UM-RLC | |
| DL-UM-RLC | |
| }, | |
| ... | |
| } | |
| ~ omit ~ | |
| UL-AM-RLC ::= | SEQUENCE { |
| t-PollRetransmit | T- |
| PollRetransmit, | |
| pollPDU | |
| PollPDU, | |
| pollByte | |
| PollByte, | |
| maxRetxThreshold | ENUMERATED |
| { | |
| t1, t2, t3, t4, t6, t8, t16, t32} | |
| } | |
| ~ omit ~ | |
| T-PollRetransmit ::= | ENUMERATED { |
| ms5, ms10, ms15, ms20, ms25, | |
| ms30, ms35, | |
| ms40, ms45, ms50, ms55, ms60, | |
| ms65, ms70, | |
| ms75, ms80, ms85, ms90, ms95, | |
| ms100, ms105, | |
| ms110, ms115, ms120, ms125, | |
| ms130, ms135, | |
| ms140, ms145, ms150, ms155, | |
| ms160, ms165, | |
| ms170, ms175, ms180, ms185, | |
| ms190, ms195, | |
| ms200, ms205, ms210, ms215, | |
| ms220, ms225, | |
| ms230, ms235, ms240, ms245, | |
| ms250, ms300, | |
| ms350, ms400, ms450, ms500, | |
| ms800-v1310, | |
| ms1000-v1310, ms2000-v1310, | |
| ms4000-v1310, | |
| spare5, spare4, spare3, | |
| spare2, spare1} | |

For example, when "t-PollRetransmit" is "ms5", it may be determined that the RLC retransmission time is 5 ms.

According to various embodiments, the electronic device (for example, the processor 120 or the communication processor 520) may identify the uplink transmission rate of the electronic device 500 in operation 603. For example, the uplink transmission rate of the electronic device 500 may be a rate at which the electronic device 500 (or the communication processor 520) transmits data to the network and may be acquired on the basis of the number of PDUs and/or the size of PDUs transmitted for a specified time for each layer of the electronic device (for example, OSI 7 layers or TCP/IP 5 layers). For example, the uplink transmission rate of the electronic device 500 may be configured on the basis of an amount of data (or packet) transmitted from the communication processor 520 to the network through the wireless communication circuit 530 for a specified time.

According to various embodiments, the electronic device (for example, the processor 120 or the communication processor 520) may configure the size of the communication buffer (for example, the communication buffer 522 of FIG. 5) of the communication processor (for example, the communication processor 520 of FIG. 5) on the basis of the RLC retransmission time and the uplink transmission rate of the electronic device in operation 605. According to an embodiment, the communication processor 520 may configure an upper limit reference of the communication buffer 522 on the basis of the uplink transmission rate of the electronic device 500 and the RLC retransmission time. For example, the upper limit reference of the communication buffer 522 may be configured as a value larger than the size of data that can be transmitted for a unit time (for example, RLC retransmission time) on the basis of the uplink transmission rate of the electronic device 500. For example, the upper limit reference of the communication buffer 522 may be up-controlled on the basis of an increase in the uplink transmission rate of the electronic device 500. According to an embodiment, the communication processor 520 may configure a lower limit reference of the communication buffer 522 on the basis of the uplink transmission rate of the electronic device 500 and the RLC retransmission time. For example, the lower limit reference of the communication buffer 522 may be configured as the size of data that can be transmitted for a unit time (for example, RLC retransmission time) on the basis of the uplink transmission rate of the electronic device 500. In another example, the lower limit reference of the communication buffer 522 may be configured such that data transmission is resumed at a time point at which a half of the RLC retransmission time passes from a time point at which the data transmission from the application processor 510 to the communication processor 520 is suspended on the basis of the upper limit reference of the communication buffer 522.

According to various embodiments, the electronic device (for example, the processor 120 or the communication processor 520) may periodically configure (or control) the size (for example, the upper limit reference and/or the lower limit reference) of the communication buffer of the communication processor on the basis of operation 601 and operation 603 of FIG. 6.

Figure 7:
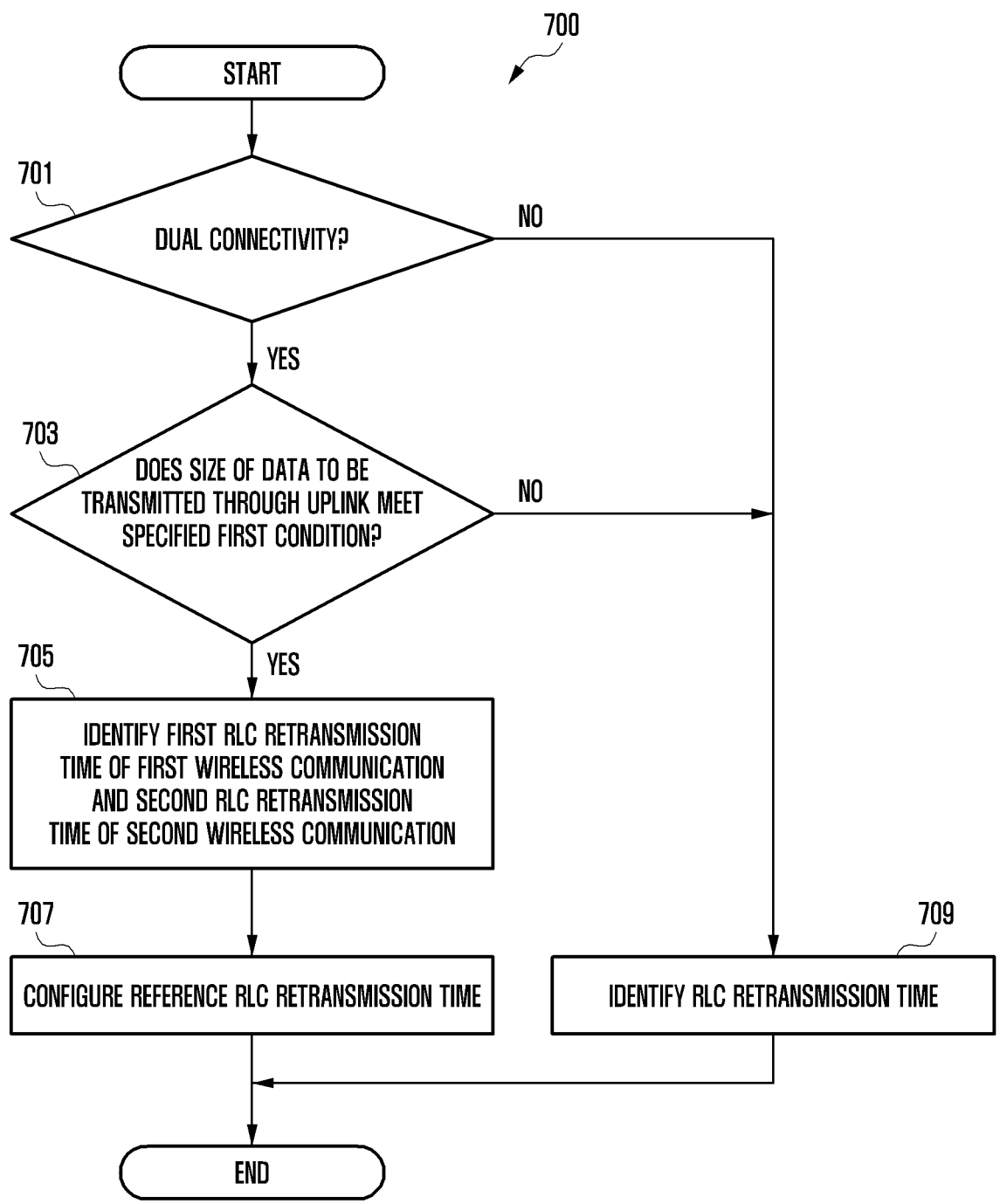
FIG. 7 is a flowchart illustrating an example process in which an electronic device identifies an RLC retransmission time according to various embodiments.

FIG. 7 is a flowchart 700 illustrating an example process in which an electronic device identifies an RLC retransmission time according to various embodiments. According to an embodiment, operations of FIG. 7 may, for example, be a detailed operation of operation 601 of FIG. 6. In the following embodiments, operations may be sequentially performed but are not necessarily sequentially performed. For example, orders of the operations may be changed, and at least two operations may be performed in parallel. For example, the electronic device of FIG. 7 may be the electronic device 101 of FIG. 1, FIG. 2, FIG. 3, FIG. 4A, FIG. 4B, or FIG. 4C or the electronic device 500 of FIG. 5.

Referring to FIG. 7, according to various embodiments, the electronic device (for example, the processor 120 of FIG. 1 or the communication processor 520 of FIG. 5) may identify whether the electronic device and/or the network supports Dual Connectivity (DC) in operation 701.

According to various embodiments, when the electronic device supports dual connectivity (for example, 'Yes' of operation 701), the electronic device (for example, the processor 120 or the communication processor 520) may identify whether the size of data to be transmitted through the uplink meets a specified first condition in operation 703. According to an embodiment, the communication processor 520 may identify whether an amount of data stored in the communication buffer 522 meets the specified first condition. For example, meeting the specified first condition may include the state in which the amount of data stored in the communication buffer 522 is larger than or equal to "ul-DataSplitThreshold" of "PDCP config". For example, the state in which the specified first condition is not met may include the state in which the amount of data stored in the communication buffer 522 is less than "ul-DataSplitThreshold" of "PDCP config". For example, "ul-DataSplitThreshold" may be included in "PDCP config" received from the network as shown in [Table 2] (for example, 3GPP TS 36.331 standard).

TABLE 2

```
-- ASN1START
PDCP-Config ::=                        SEQUENCE {
  discardTimer
  ENUMERATED {
    ms50, ms100, ms150, ms300, ms500,
    ms750, ms1500, infinity
  }
                                       OPTIONAL,
  -- Cond Setup
  rlc-AM
  SEQUENCE {
    statusReportRequired
  BOOLEAN
  }
                                       OPTIONAL,
  -- Cond Rlc-AM
  rlc-UM
  SEQUENCE {
    pdcp-SN-Size
    ENUMERATED {len7bits, len12bits}
  }
                                       OPTIONAL,
  --
~ omit ~
  [[ ul-DataSplitThreshold-r13         CHOICE {
    release
  NULL,
    setup
  ENUMERATED {
      b0, b100, b200, b400, b800, b1600,
  b3200,
        b6400, b12800, b25600, b51200,
  b102400,
        b204800, b409600, b819200,
  spare1}    }
```

For example, when "ul-DataSplitThreshold" is "b100", the communication processor 520 may identify whether the amount of data stored in the communication buffer 522 exceeds 100 bytes.

According to various embodiments, when the size of data to be transmitted by the electronic device through the uplink meets the specified first condition (for example, 'Yes' of operation 703), the electronic device (for example, the processor 120 or the communication processor 520) may identify a first RLC retransmission time of first wireless communication and a second RLC retransmission time of second wireless communication by dual connectivity in operation 705. According to an embodiment, when the size of data to be transmitted by the electronic device 500 through the uplink meets the specified first condition, the communication processor 520 may determine that data is transmitted through the first wireless communication with an MN (for example, the MN 410 of FIG. 4A) and the second wireless communication with an SN (for example, the SN 420 of FIG. 4A). For example, the communication processor 520 may identify the first RLC retransmission time in an RRC control message (for example, RRCConnectionReconfiguration) related to the first wireless communication received from the MN 410. For example, the communication processor 520 may identify the second RLC retransmission time in an RRC control message (for example, RRCConnectionReconfiguration) related to the second wireless communication received from the SN 420.

According to various embodiments, the electronic device (for example, the processor 120 or the communication processor 520) may configure a reference RLC retransmission time to be used for configuring the size of the communication buffer 522 on the basis of the first RLC retransmission time and the second RLC retransmission time in operation 707. According to an embodiment, the communication processor 520 may configure an RLC retransmission time configured to be relatively longer among the first RLC retransmission time with the MN 410 and the second RLC retransmission time with the SN 420 as the reference RLC retransmission time to be used for configuring the size of the communication buffer 522.

According to various embodiments, when the electronic device does not support dual connectivity (for example, 'No' of operation 701) or the size of data to be transmitted by the electronic device through the uplink does not meet the specified first condition (for example, 'No' of operation 703), the electronic device (for example, the processor 120 or the communication processor 520) may identify the RLC retransmission time in operation 709. According to an embodiment, when the electronic device 500 does not support dual connectivity, the communication processor 520 may identify the RLC retransmission time in the RRC control message (for example, RRCConnectionReconfiguration) received from the network. According to an embodiment, when the amount of data stored in the communication buffer 522 does not meet the specified first condition, the communication processor 520 may determine that data is transmitted through the first wireless communication with the MN 410. Accordingly, the communication processor 520 may identify the first RLC retransmission time in an RRC control message (for example, RRCConnectionReconfiguration) related to the first wireless communication received from the MN 410. For example, the communication processor 520 may determine the first RLC retransmission time as the reference RLC retransmission time to be used for configuring the size of the communication buffer 522.

According to various embodiments, when dual connectivity is supported, the electronic device (for example, the processor 120 or the communication processor 520) may determine a sum of uplink transmission rates of wireless communication used for data transmission as the uplink transmission rate of the electronic device 500. According to an embodiment, when the size of data to be transmitted by the electronic device 500 through the uplink meets the specified first condition, the communication processor 520 may acquire the uplink transmission rate on the basis of an amount of data transmitted to the network through the first wireless communication with the MN 410 and the second wireless communication with the SN 420. According to an embodiment, when the amount of data stored in the communication buffer 522 does not meet the specified first condition, the communication processor 520 may acquire the uplink transmission rate on the basis of an amount of data transmitted to the network through the first wireless communication with the MN 410.

Figure 8:
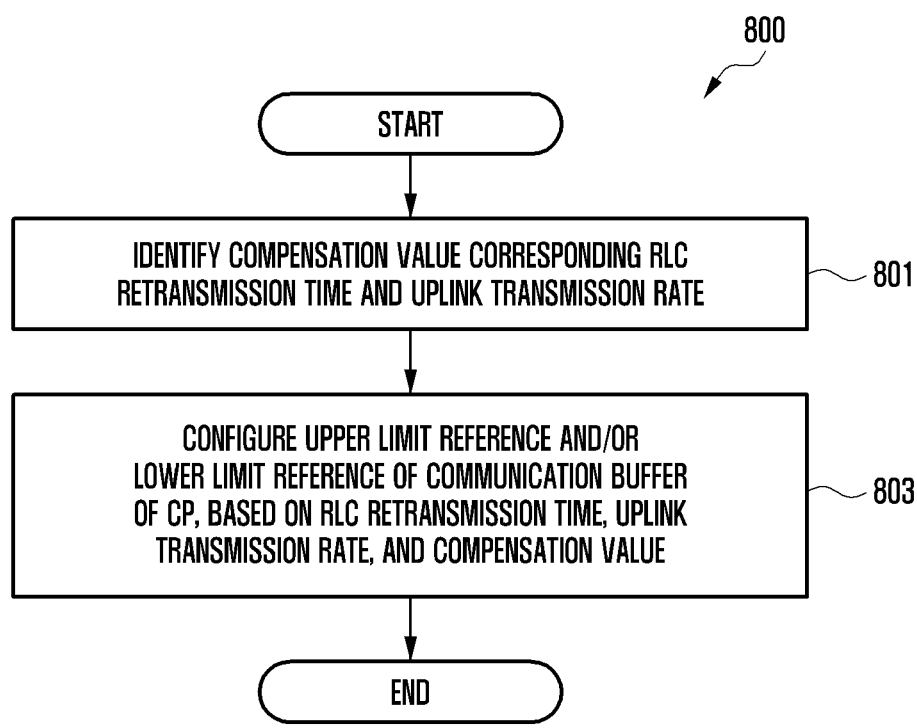
FIG. 8 is a flowchart illustrating an example process in which an electronic device configures the size of a communication buffer of a communication processor based on a compensation value according to various embodiments.

FIG. 8 is a flowchart 800 illustrating an example process in which an electronic device configures the size of a communication buffer of the communication processor on the basis of a compensation value according to various embodiments. According to an embodiment, operations of FIG. 8 may be a detailed operation of operation 605 of FIG. 6. In the following embodiments, operations may be sequentially performed but are not necessarily sequentially performed. For example, orders of the operations may be changed, and at least two operations may be performed in parallel. For example, the electronic device of FIG. 8 may be the electronic device 101 of FIG. 1, FIG. 2, FIG. 3, FIG. 4A, FIG. 4B, or FIG. 4C or the electronic device 500 of FIG. 5.

Referring to FIG. 8, according to various embodiments, the electronic device (for example, the processor 120 of FIG. 1 or the communication processor 520 of FIG. 5) may identify the RL retransmission time and/or a compensation value corresponding to the uplink transmission rate of the electronic device in, for example, a predefined compensation value table in operation 801.

According to various embodiments, the electronic device (for example, the processor 120 or the communication processor 520) may configure (or control) the upper limit reference and/or the lower limit reference of the communication buffer (for example, the communication buffer 522 of FIG. 5) of the communication processor (for example, the communication processor 520 of FIG. 5) on the basis of the RLC retransmission time, the uplink transmission rate of the electronic device, and a compensation value selected from the predefined compensation value table in operation 803. For example, the upper limit reference of the communication buffer 522 may include information related to a reference for configuring the size of an area that can be used for storing data in the communication buffer 522. For example, the lower limit reference of the communication buffer 522 may include information related to a reference for determining a time point at which data transmission of the application processor 510 is resumed in the state in which data transmission from the application processor 510 to the communication processor 520 is suspended.

Figure 9:
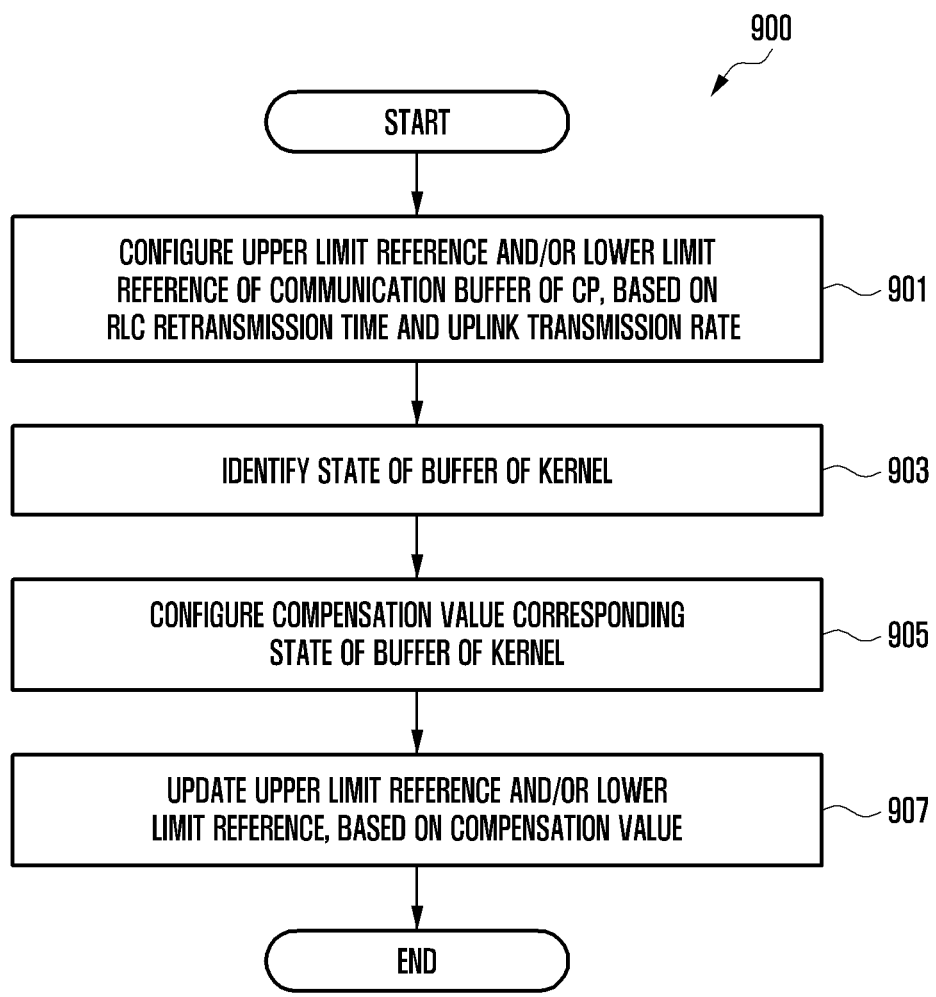
FIG. 9 is a flowchart illustrating an example process in which an electronic device updates the size of communication buffer of a communication processor according to various embodiments.

FIG. 9 is a flowchart 900 illustrating an example process in which an electronic device updates the size of a communication buffer of a communication processor according to various embodiments. According to an embodiment, operations of FIG. 9 may be operations that can be generated after operation 605 of FIG. 6. In the following embodiments, operations may be sequentially performed but are not necessarily sequentially performed. For example, orders of the operations may be changed, and at least two operations may be performed in parallel. For example, the electronic device of FIG. 9 may be the electronic device 101 of FIG. 1, FIG. 2, FIG. 3, FIG. 4A, FIG. 4B, or FIG. 4C or the electronic device 500 of FIG. 5.

Referring to FIG. 9, the electronic device (for example, the processor 120 of FIG. 1 or the communication processor 520 of FIG. 5) may configure (or control) the upper limit reference and/or the lower limit reference of the communication buffer (for example, the communication buffer 522 of FIG. 5) of the communication processor (for example, the communication processor 520 of FIG. 5) on the basis of the RLC retransmission time and the uplink transmission rate of the electronic device in operation 901. According to an embodiment, the upper limit reference of the communication buffer 522 may be configured as a value larger than the size of data that can be transmitted for a unit time (for example, RLC retransmission time) on the basis of the uplink transmission rate of the electronic device 500. According to an embodiment, the lower limit reference of the communication buffer 522 may be configured as a value corresponding to the size of data that can be transmitted for a unit time (for example, RLC retransmission time) on the basis of the uplink transmission rate of the electronic device 500.

According to various embodiments, the electronic device (for example, the processor 120 or the communication processor 520) may identify a status (e.g., state) of the buffer of the kernel of the application processor (for example, the application processor 510 of FIG. 5) in operation 903. According to an embodiment, the buffer of the kernel of the application processor 510 may be a buffer included in a memory (for example, at least a partial area of the volatile memory 132 of FIG. 1 or a separate memory) allocated to the application processor 510. According to an embodiment, the status of the buffer of the kernel may include an amount of data (or packet) that flows into a network stack (for example, the operating system 142 of FIG. 1) of the kernel of the application processor 510 and is stored in the shared memory.

According to various embodiments, the electronic device (for example, the processor 120 or the communication processor 520) may configure a compensation value related to the upper limit reference and/or the lower limit reference of the communication buffer (for example, the communication buffer 522 of FIG. 5) on the basis of the status (state) of the buffer of the kernel of the application processor (for example, the application processor 510 of FIG. 5) in operation 905. For example, as the amount of data that flows into the network stack (for example, the operating system 142 of FIG. 1) of the kernel and is stored in the shared memory is relatively larger, the compensation value may be configured to be relatively larger.

According to various embodiments, the electronic device (for example, the processor 120 or the communication processor 520) may update the upper limit reference and/or the lower limit reference of the communication buffer (for example, the communication buffer 522 of FIG. 5) of the communication processor (for example, the communication processor 520 of FIG. 5) on the basis of a compensation value configured on the basis of the status (state) of the buffer of the kernel in operation 907. According to an embodiment, even though the electronic device 500 dynamically configures the size of the communication buffer 522 of the communication processor 520, data may be accumulated in the kernel of the application processor 510 and thus a data transmission delay may be generated as described in operations 601 to 605 of FIG. 6. Accordingly, the electronic device 500 may reduce the data transmission delay by updating the size of the communication buffer 522 of the communication processor 520 in consideration of the status of the buffer of the kernel of the application processor 510 to increase an amount of resources received from the network According to various embodiments, the electronic device (for example, the processor 120 or the communication processor 520) may selectively configure a compensation value on the basis of the status of the buffer of the kernel of the application processor 510. According to an embodiment, when the amount of data (or packet) flowing in the network stack (for example, the operating system 142 of FIG. 1) of the kernel of the application processor 510 and stored in the shared memory meets a specified fourth condition, the communication processor 520 may configure a compensation value related to the upper limit reference and/or the lower limit reference of the communication buffer 522 on the basis of the status of the buffer of the kernel of the application processor 510. For example, meeting the specified fourth condition may include the state in which the amount of data (or packet) that flows into the network stack (for example, the operating system 142 of FIG. 1) of the kernel and is stored in the shared memory exceeds a reference amount of data configured to determine whether the compensation value is applied.

According to an embodiment, when the amount of data (or packet) flowing in the network stack (for example, the operating system 142 of FIG. 1) of the kernel of the application processor 510 and stored in the shared memory does not meet the specified fourth condition, the communication processor 520 may determine to maintain the upper limit reference and the lower limit reference of the communication buffer 522. For example, the state in which the specified fourth condition is not met may include the state in which the amount of data (or packet) flowing into the network stack (for example, the operating system 142 of FIG. 1) of the kernel and stored in the shared memory is equal to or less than a reference amount of data configured to determine whether the compensation value is applied.

According to various embodiments, when configuring the size of the communication buffer 522 of the communication processor 520, the electronic device (for example, the processor 120 or the communication processor 520) may apply a compensation value based on the status (state) of the buffer of the kernel of the application processor 510. According to an embodiment, the communication processor 520 may configure the upper limit reference and/or the lower limit reference of the communication buffer 522 on the basis of the uplink transmission rate, the RLF retransmission time, and the compensation value based on the status of the buffer of the kernel.

Figure 10:
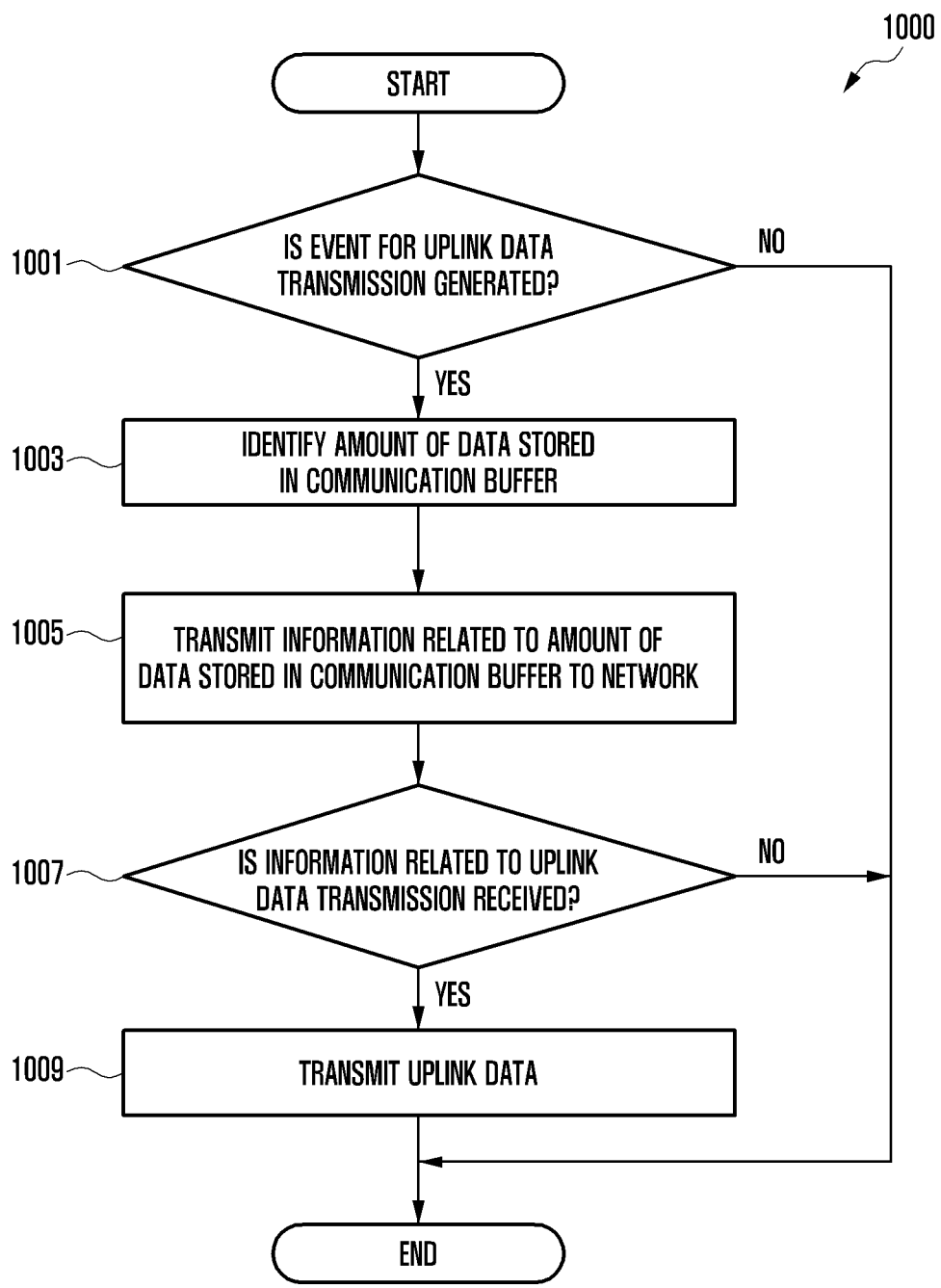
FIG. 10 is a flowchart illustrating an example process in which an electronic device transmits uplink data according to various embodiments.

FIG. 10 is a flowchart 1000 illustrating an example process in which an electronic device transmits uplink data according to various embodiments. In the following embodiments, operations may be sequentially performed but are not necessarily sequentially performed. For example, orders of the operations may be changed, and at least two operations may be performed in parallel. For example, the electronic device of FIG. 7 may be the electronic device 101 of FIG. 1, FIG. 2, FIG. 3, FIG. 4A, FIG. 4B, or FIG. 4C or the electronic device 500 of FIG. 5.

Referring to FIG. 10, according to various embodiments, the electronic device (for example, the processor 120 of FIG. 1 or the communication processor 520 of FIG. 5) may identify whether an event for uplink data transmission is generated in operation 1001. According to an embodiment, the event for uplink data transmission may be generated on the basis of a user input related to uplink data transmission and/or an application program being executed in the electronic device 500.

According to various embodiments, when the event for uplink data transmission is not generated (for example, "No" of operation 1001), the electronic device (for example, the processor 120 or the communication processor 520) may end the process for uplink data transmission.

According to various embodiments, when the event for uplink data transmission is generated (for example, 'Yes' of operation 1001), the electronic device (for example, the processor 120 or the communication processor 520) may identify an amount (or size) of data stored in the communication buffer (for example, the communication buffer 522 of FIG. 5) of the communication processor (for example, the communication processor 520 of FIG. 5) in operation 1003. According to an embodiment, the communication processor 520 may identify a Buffer Size Index (BSI) corresponding to the amount of data stored in the communication buffer 522. For example, the BSI corresponding to the amount of data stored in the communication buffer 522 may be selected in a table as shown in [Table 3] (for example, 3GPP TS 36.321).

TABLE 3

| Index | Buffer Size (BS) value [bytes] |
|---|---|
| 0 | BS = 0 |
| 1 | 0 < BS <= 10 |
| 2 | 10 < BS <= 13 |
| 3 | 13 < BS <= 16 |
| 4 | 16 < BS <= 19 |
| 5 | 19 < BS <= 23 |
| 6 | 23 < BS <= 29 |
| 7 | 29 < BS <= 35 |
| 8 | 35 < BS <= 43 |
| 9 | 43 < BS <= 53 |
| 10 | 53 < BS <= 65 |
| 11 | 65 < BS <= 80 |
| 12 | 80 < BS <= 98 |
| 13 | 98 < BS <= 120 |
| 14 | 120 < BS <= 147 |
| 15 | 147 < BS <= 181 |
| 16 | 181 < BS <= 223 |
| 17 | 223 < BS <= 274 |
| 18 | 274 < BS <= 337 |
| 19 | 337 < BS <= 414 |
| 20 | 414 < BS <= 509 |
| 21 | 509 < BS <= 625 |
| 22 | 625 < BS <= 769 |
| 23 | 769 < BS <= 945 |
| 24 | 945 < BS <= 1162 |
| 25 | 1162 < BS <= 1429 |
| 26 | 1429 < BS <= 1757 |
| 27 | 1757 < BS <= 2161 |
| 28 | 2161 < BS <= 2657 |
| 29 | 2657 < BS <= 3267 |
| 30 | 3267 < BS <= 4017 |
| 31 | 4017 < BS <= 324940 |
| 32 | 4940 < BS <= 6074 |
| 33 | 6074 < BS <= 7469 |
| 34 | 7469 < BS <= 9185 |
| 35 | 9185 < BS <= 11294 |
| 36 | 11294 < BS <= 13888 |
| 37 | 13888 < BS <= 17077 |
| 38 | 17077 < BS <= 20999 |
| 39 | 20999 < BS <= 25822 |
| 40 | 25822 < BS <= 31752 |
| 41 | 31752 < BS <= 39045 |
| 42 | 39045 < BS <= 48012 |
| 43 | 48012 < BS <= 59039 |
| 44 | 59039 < BS <= 72598 |
| 45 | 72598 < BS <= 89272 |
| 46 | 89272 < BS <= 109774 |
| 47 | 109774 < BS <= 134986 |
| 48 | 134986 < BS <= 165989 |
| 49 | 165989 < BS <= 204111 |
| 50 | 204111 < BS <= 250990 |
| 51 | 250990 < BS <= 308634 |
| 52 | 308634 < BS <= 379519 |
| 53 | 379519 < BS <= 466683 |
| 54 | 466683 < BS <= 573866 |
| 55 | 573866 < BS <= 705666 |
| 56 | 705666 < BS <= 867737 |
| 57 | 867737 < BS <= 1067031 |
| 58 | 1067031 < BS <= 1312097 |

TABLE 3-continued

| Index | Buffer Size (BS) value [bytes] |
|---|---|
| 59 | 1312097 < BS <= 1613447 |
| 60 | 1613447 < BS <= 1984009 |
| 61 | 1984009 < BS <= 2439678 |
| 62 | 2439678 < BS <= 3000000 |
| 63 | BS > 3000000 |

For example, when the amount of data stored in the communication buffer 522 is 82 bytes, the BSI corresponding to the amount of data stored in the communication buffer 522 may be configured as '12'.

According to various embodiments, the electronic device (for example, the processor 120 or the communication processor 520) may transmit information related to the amount of data stored in the communication buffer (for example, the communication buffer 522 of FIG. 5) of the communication processor (for example, the communication processor 520 of FIG. 5) to the network in operation 1005. According to an embodiment, the communication processor 520 may transmit a Buffer Status Report (BSR) message including the BSI corresponding to the amount of data stored in the communication buffer 522 to the network.

According to various embodiments, the electronic device (for example, the processor 120 or the communication processor 520) may identify whether information related to uplink data transmission is received from the network in response to the information related to the amount of data stored in the communication buffer (for example, the communication buffer 522 of FIG. 5) of the communication processor (for example, the communication processor 520 of FIG. 5) in operation 1007. According to an embodiment, the communication processor 520 may identify whether an uplink grant message is received from the network in response to the buffer status report message.

According to various embodiments, when the information related to the uplink data transmission is not received from the network (for example, 'No' of operation 1007), the electronic device (for example, the processor 120 or the communication processor 520) may end the process for uplink data transmission.

According to various embodiments, when the information related to the uplink data transmission is received from the network (for example, 'Yes' of operation 1007), the electronic device (for example, the processor 120 or the communication processor 520) may transmit data stored in the communication buffer (for example, the communication buffer 522 of FIG. 5) of the communication processor (for example, the communication processor 520 of FIG. 5) to the network in operation 1009. According to an embodiment, the communication processor 520 may identify resources for uplink data transmission allocated by the network in the uplink grant message received from the network. The communication processor 520 may control the wireless communication circuit 530 to transmit data stored in the communication buffer 522 through the resources allocated by the network.

Figure 11:
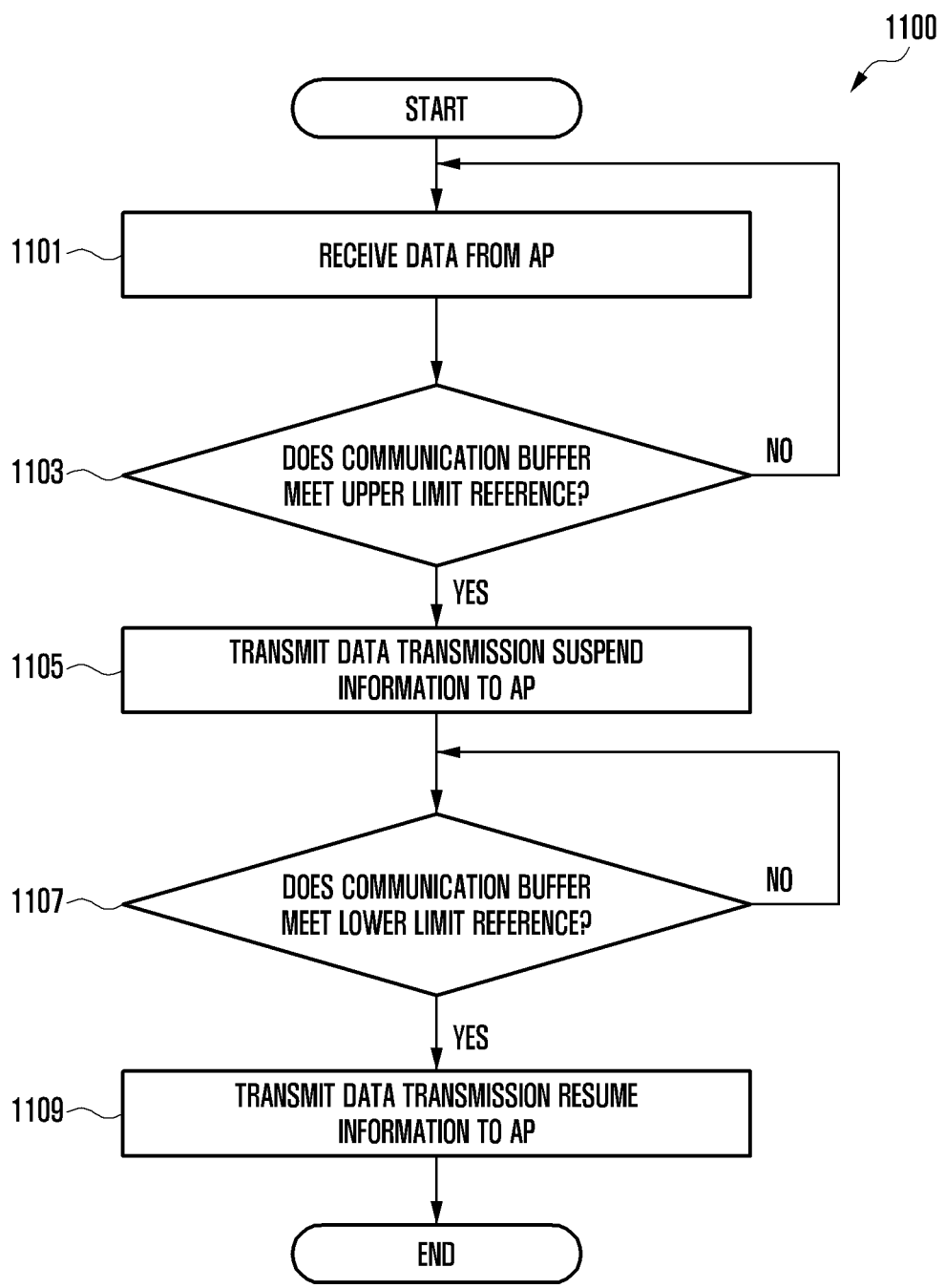
FIG. 11 is a flowchart illustrating an example process in which an electronic device operates a communication buffer of a communication processor according to various embodiments.

FIG. 11 is a flowchart 1100 illustrating an example process in which an electronic device operates a communication buffer of a communication processor according to various embodiments. In the following embodiments, operations may be sequentially performed but are not necessarily sequentially performed. For example, orders of the operations may be changed, and at least two operations may be performed in parallel. For example, the electronic device of FIG. 11 may be the electronic device 101 of FIG. 1, FIG. 2, FIG. 3, FIG. 4A, FIG. 4B, or FIG. 4C or the electronic device 500 of FIG. 5.

Referring to FIG. 11, according to various embodiments, the communication processor (for example, the processor 120 of FIG. 1 or the communication processor 520 of FIG. 5) of the electronic device (for example, the electronic device 500 of FIG. 5) may receive data (or packet) from the application processor (for example, the application processor 510 of FIG. 5) in operation 1101. According to an embodiment, the communication processor 520 may store the data received from the application processor 510 in the communication buffer 522.

According to various embodiments, the communication processor (for example, the processor 120 or the communication processor 520) of the electronic device (for example, the electronic device 500) may identify whether an amount of data stored in the communication buffer (for example, the communication buffer 522 of FIG. 5) meets an upper limit reference of the communication buffer in operation 1103. According to an embodiment, the upper limit reference of the communication buffer 522 may be configured on the basis of an RLC retransmission time and an uplink transmission rate of the electronic device as a reference for configuring the size of the communication buffer 522 as described in operations 601 to 605 of FIG. 6.

According to various embodiments, when the amount of data stored in the communication buffer (for example, the communication buffer 522 of FIG. 5) does not meet the upper limit reference of the communication buffer (for example, 'No' of operation 1103), the communication processor (for example, the processor 120 or the communication processor 520) of the electronic device (for example, the electronic device 500) may store the data received from the application processor 510 in the communication buffer 522 in operation 1101. For example, the state in which the upper limit reference is not met may include the state in which the amount of data stored in the communication buffer 522 is less than a value configured as the upper limit reference.

According to various embodiments, when the amount of data stored in the communication buffer (for example, the communication buffer 522 of FIG. 5) meets the upper limit reference of the communication buffer (for example, 'Yes' of operation 1103), the communication processor (for example, the processor 120 or the communication processor 520) of the electronic device (for example, the electronic device 500) may transmit data transmission suspend information to the application processor 510 in operation 1105. According to an embodiment, the application processor 510 may suspend data transmission to the communication processor 520 on the basis of the data transmission suspend information received from the communication processor 520. For example, when the data transmission to the communication processor 520 is suspended, the application processor 510 may store data to be transmitted to the communication processor 520 in a memory (for example, shared memory). For example, meeting the upper limit reference may include the state in which the amount of data stored in the communication buffer 522 is larger than or equal to a value configured as the upper limit reference.

According to various embodiments, the data transmission suspend information is transmitted to the application processor 510 (for example, operation 1105), the communication processor (for example, the processor 120 or the communication processor 520) of the electronic device (for example, the electronic device 500) may identify whether the amount of data stored in the communication buffer (for example, the communication buffer 522 of FIG. 5) meets the lower limit reference of the communication buffer in operation 1107. According to an embodiment, the communication processor 520 may control the wireless communication circuit 530 to transmit the data stored in the communication buffer 522 to the network. For example, the data transmitted to the network may be removed from the communication buffer 522. Accordingly, the communication processor 520 may identify whether the amount of data stored in the communication buffer 522 meets the lower limit reference of the communication buffer 522 on the basis of data transmission to the network. For example, the lower limit reference of the communication buffer 522 may be configured on the basis of the RLC retransmission time and the uplink transmission rate of the electronic device as described in operations 601 to 605 of FIG. 6.

According to various embodiments, when the amount of data stored in the communication buffer (for example, the communication buffer 522 of FIG. 5) does not meet the lower limit reference (for example, 'No' of operation 1107), the communication processor (for example, the processor 120 or the communication processor 520) of the electronic device (for example, the electronic device 500) may identify whether the amount of data stored in the communication buffer (for example, the communication buffer 522 of FIG. 5) meets the lower limit reference of the communication buffer in operation 1107. For example, the state in which the lower limit reference is not met may include the state in which the amount of data stored in the communication buffer 522 exceeds a value configured as the lower limit reference.

According to various embodiments, when the amount of data stored in the communication buffer (for example, the communication buffer 522 of FIG. 5) meets the lower limit reference (for example, 'Yes' of operation 1107), the communication processor (for example, the processor 120 or the communication processor 520) of the electronic device (for example, the electronic device 500) may transmit data transmission resume information to the application processor 510 in operation 1109. According to an embodiment, the communication processor 520 may store the data received from the application processor 510 in the communication buffer 522 on the basis of the data transmissions resume information. For example, meeting the lower limit reference may include the state in which the amount of data stored in the communication buffer 522 is equal to or less than the value configured as the lower limit reference.

Figure 12:
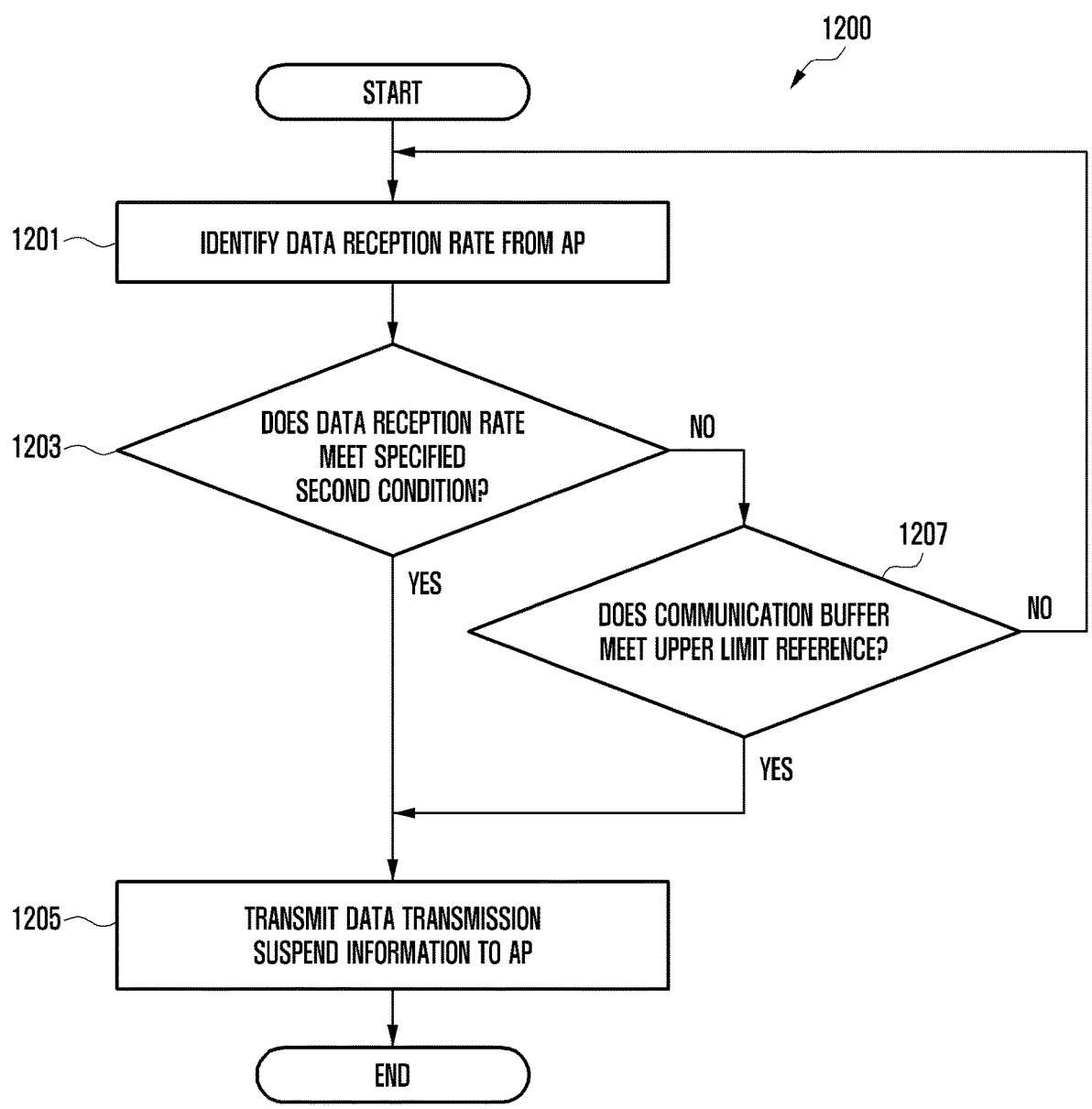
FIG. 12 is a flowchart illustrating an example process in which an electronic device suspends data transmission to communication buffer of a communication processor according to various embodiments.

FIG. 12 is a flowchart 1200 illustrating an example process in which an electronic device suspends data transmission to a communication buffer of a communication processor according to various embodiments. According to an embodiment, operations of FIG. 12 may be a detailed operation of operation 1103 of FIG. 11. In the following embodiments, operations may be sequentially performed but are not necessarily sequentially performed. For example, orders of the operations may be changed, and at least two operations may be performed in parallel. For example, the electronic device of FIG. 12 may be the electronic device 101 of FIG. 1, FIG. 2, FIG. 3, FIG. 4A, FIG. 4B, or FIG. 4C or the electronic device 500 of FIG. 5.

Referring to FIG. 12, according to various embodiments, a communication processor (for example, the processor 120 of FIG. 1 or the communication processor 520 of FIG. 5) of an electronic device (for example, the electronic device 500 of FIG. 5) may identify a data reception rate from an application processor (for example, the application processor 510 of FIG. 5) in operation 1201. For example, the data reception rate may be acquired on the basis of an amount of data received from the application processor 510 for a specified time.

According to various embodiments, the communication processor (for example, the processor 120 or the communication processor 520) of the electronic device (for example, the electronic device 500) may identify whether the data reception rate from the application processor (for example, the application processor 510) meets a specified second condition in operation 1203.

According to various embodiments, when the data reception rate from the application processor (for example, the application processor 510) meets the specified second condition (for example, "Yes" of operation 1203), the communication processor (for example, the processor 120 or the communication processor 520) of the electronic device (for example, the electronic device 500) may transmit data transmission suspend information to the application processor 510 in operation 1205. According to an embodiment, the application processor 510 may suspend data transmission to the communication processor 520 on the basis of the data transmission suspend information received from the communication processor 520. For example, meeting the specified second condition may include the state in which the data reception rate from the application processor 510 exceeds the uplink transmission rate of the electronic device 500.

According to various embodiments, when the data reception rate from the application processor (for example, the application processor 510) does not meet the specified second condition (for example, "No" of operation 1203), the communication processor (for example, the processor 120 or the communication processor 520) of the electronic device (for example, the electronic device 500) may identify whether the amount of data stored in the communication buffer (for example, the communication buffer 522 of FIG. 5) meets the upper limit reference of the communication buffer in operation 1207. According to an embodiment, the upper limit reference of the communication buffer 522 may be configured on the basis of the RLC retransmission time and the uplink transmission rate of the electronic device.

According to various embodiments, when the amount of data stored in the communication buffer (for example, the communication buffer 522 of FIG. 5) does not meet the upper limit reference of the communication buffer (for example, "No" of operation 1207), the communication processor (for example, the processor 120 or the communication processor 520) of the electronic device (for example, the electronic device 500) may identify the data reception rate from the application processor (for example, the application processor 510 of FIG. 5) in operation 1201.

According to various embodiments, when the amount of data stored in the communication buffer (for example, the communication buffer 522 of FIG. 5) meets the upper limit reference of the communication buffer (for example, 'Yes' of operation 1207), the communication processor (for example, the processor 120 or the communication processor 520) of the electronic device (for example, the electronic device 500) may transmit data transmission suspend information to the application processor 510 in operation 1205.

According to various embodiments, when the amount of data flowing from the application processor 510 is relatively larger than the amount of data transmitted to the network, the communication processor 520 may increase the amount of data accumulated in the communication buffer 522. Accordingly, the communication processor 520 may reduce a transmission delay by the communication buffer 522 by suspending data transmission of the application processor 510 on the basis of the data reception rate from the application processor 510.

Figure 13:
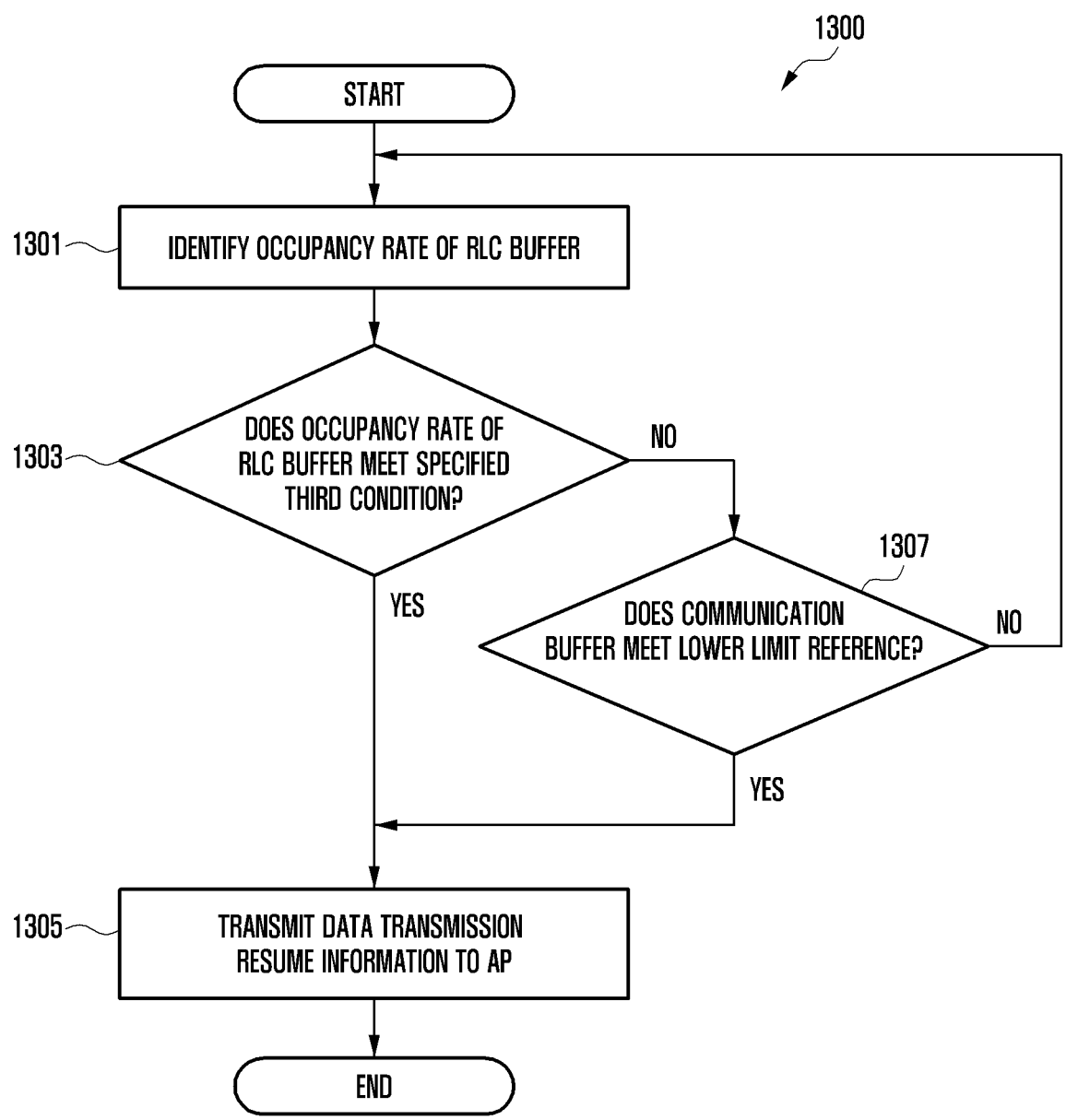
FIG. 13 is a flowchart illustrating an example process in which an electronic device resumes data transmission to a communication buffer of a communication processor according to various embodiments.

FIG. 13 is a flowchart 1300 illustrating an example process in which an electronic device resumes data transmission from a communication processor to a communication buffer according to various embodiments. According to an embodiment, operations of FIG. 13 may be a detailed operation of operation 1107 of FIG. 11. In the following embodiments, operations may be sequentially performed but are not necessarily sequentially performed. For example, orders of the operations may be changed, and at least two operations may be performed in parallel. For example, the electronic device of FIG. 13 may be the electronic device 101 of FIG. 1, FIG. 2, FIG. 3, FIG. 4A, FIG. 4B, or FIG. 4C or the electronic device 500 of FIG. 5.

Referring to FIG. 13, according to various embodiments, when data transmission suspend information is transmitted to the application processor 510 (for example, operation 1105 of FIG. 11), the communication processor (for example, the processor 120 of FIG. 1 or the communication processor 520 of FIG. 5) of the electronic device (for example, the electronic device 500 of FIG. 5) may identify an occupancy rate of an RLC buffer in operation 1301. For example, the data occupancy rate of the RLC buffer may include an average of data occupancy rates of the RLC buffer detected for a reference time or a reference number of times or a standard deviation of data occupancy rates of the RLC buffer. For example, the RLC buffer may include a transmission buffer for temporarily storing transmission data in an LRC layer.

According to various embodiments, the communication processor (for example, the processor 120 or the communication processor 520) of the electronic device (for example, the electronic device 500) may identify whether the occupancy rate of the RLC buffer meets a specified third condition in operation 1303.

According to various embodiments, when the occupancy rate of the RLC buffer meets the specified third condition ("Yes" of operation 1303), the communication processor (for example, the processor 120 or the communication processor 520) of the electronic device (for example, the electronic device 500) may transmit data transmission suspend information to the application processor 510 in operation 1305. According to an embodiment, the communication processor 520 may store the data received from the application processor 510 in the communication buffer 522 on the basis of the data transmissions resume information. For example, meeting the specified third condition may include that state in which the data occupancy rate of the RLC buffer becomes relatively low. In another example, meeting the specified third condition may include that state in which the standard deviation of the data occupancy rates of the RLC buffer is relatively large.

According to various embodiments, when the occupancy rate of the RLC buffer does not meet the specified third condition ("No" of operation 1303), the communication processor (for example, the processor 120 or the communication processor 520) of the electronic device (for example, the electronic device 500) may identify whether the amount of data stored in the communication buffer (for example, the communication buffer 522 of FIG. 5) meets the lower limit reference of the communication buffer in operation 1307. According to an embodiment, the communication processor 520 may identify whether the amount of data stored in the communication buffer 522 meets the lower limit reference of the communication buffer 522 on the basis of data transmission to the network. For example, the lower limit reference of the communication buffer 522 may be configured on the basis of the RLC retransmission time and the uplink transmission rate of the electronic device.

According to various embodiments, when the amount of data stored in the communication buffer (for example, the communication buffer 522 of FIG. 5) does not meet the lower limit reference (for example, "No" of operation 1307), the communication processor (for example, the processor 120 or the communication processor 520) of the electronic device (for example, the electronic device 500) may identify the occupancy rate of the RLC buffer in operation 1301.

According to various embodiments, when the amount of data stored in the communication buffer (for example, the communication buffer 522 of FIG. 5) meets the lower limit reference (for example, 'Yes' of operation 1307), the communication processor (for example, the processor 120 or the communication processor 520) of the electronic device (for example, the electronic device 500) may transmit data transmission resume information to the application processor 510 in operation 1305. According to an embodiment, the communication processor 520 may store the data received from the application processor 510 in the communication buffer 522 on the basis of the data transmissions resume information.

According to various embodiments, when data transmission of the application processor 510 is suspended and the amount of data stored in the communication buffer 522 does not meet the lower limit reference, data may be accumulated in the RLC buffer and thus the electronic device 500 may have deterioration of the uplink transmission rate due to the occupancy of the RLC buffer. For example, when the electronic device 500 cannot maintain the occupancy rate of the RLC buffer at a specified level (for example, a reference occupancy rate) in the state in which the amount of data stored in the communication buffer 522 does not meet the lower limit reference, a BSI corresponding to the size of the communication buffer 522 is not uniformly reported to the network and thus the uplink transmission rate may be reduced. Accordingly, the electronic device 500 may reduce deterioration of the uplink transmission rate by the RLC buffer by resuming data transmission of the application processor 510 on the basis of the occupancy rate of the RLC buffer in the state in which the amount of data stored in the communication buffer 522 does not meet the lower limit reference. For example, the specified third condition may include information for determining whether the occupancy rate of the RLC buffer maintains the specified level.

According to various example embodiments, a method of operating an electronic device (for example, the electronic device 101 of FIG. 1, FIG. 2, FIG. 3, FIG. 4A, FIG. 4B, or FIG. 4C or the electronic device 500 of FIG. 5) may include: identifying a Radio Link Control (RLC) retransmission time by a communication processor (for example, the auxiliary processor 123 of FIG. 1 or the communication processor 520 of FIG. 5) including a communication buffer (for example, the communication buffer 522 of FIG. 5), identifying an uplink transmission rate, and configuring a size of an area for storing data in the communication buffer based on the RLC retransmission time and the uplink transmission rate.

According to various example embodiments, the RLC retransmission time may be acquired from a Radio Resource Control (RRC) control message.

According to various example embodiments, the operation of identifying the RLC retransmission time may include: identifying the size of uplink data based on dual connectivity of first wireless communication and second wireless communication being supported, identifying a first RLC retransmission time of the first wireless communication and a second RLC retransmission time of the second wireless communication based on the size of the uplink data meeting a specified first condition, and configuring the RLC retransmission time based on the first RLC retransmission time and the second RLC retransmission time.

According to various example embodiments, the operation of configuring the RLC retransmission time may include selecting a value larger among the first RLC retransmission time and the second RLC retransmission time as the reference RLC retransmission time.

According to various example embodiments, the uplink transmission rate may be estimated on the basis of a number of Protocol Data Units (PDUs) transmitted through an uplink for a specified time and a size of PDUs.

According to various example embodiments, the operation of configuring the size of the area for storing the data in the communication buffer may include configuring at least one of an upper limit reference or a lower limit reference of the communication buffer based on the RLC retransmission time and the uplink transmission rate.

According to various example embodiments, the method may further include transmitting information on data transmission suspend to the application processor based on an amount of data stored in the communication buffer meeting the upper limit reference.

According to various example embodiments, the method may further include: identifying a data reception rate from the application processor based on the amount of data stored in the communication buffer not meeting the upper limit reference and transmitting the information on the data transmission suspend to the application processor based on the data reception rate meeting a second condition.

According to various example embodiments, the method may further include: transmitting information related to data transmission resume to the application processor based on an amount of data stored in the communication buffer meeting the lower limit reference in a state in which data transmission of the application processor is suspended.

According to various example embodiments, the method may further include: identifying an occupancy rate of an RLC buffer based on the amount of data stored in the communication buffer not meeting the lower limit reference in the state in which data transmission by the application processor is suspended and transmitting the information related to the data transmission resume to the application processor based on the data occupancy rate of the RLC buffer meeting a specified third condition.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:
a wireless communication circuit;
an application processor; and
a communication processor operatively connected to the wireless communication circuit and the application processor and comprising a communication buffer,
wherein the communication processor is configured to:
identify a Radio Link Control (RLC) retransmission time,
identify an uplink transmission rate, and configure a size of an area for storing data in the communication buffer based on the RLC retransmission time and the uplink transmission rate.

2. The electronic device of claim 1, wherein the communication processor is configured to acquire the RLC retransmission time from a Radio Resource Control (RRC) control message.

3. The electronic device of claim 1, wherein the communication processor is configured to: identify a size of uplink data based on dual connectivity of first wireless communication and second wireless communication being supported,
 identify a first RLC retransmission time of the first wireless communication and a second RLC retransmission time of the second wireless communication based on the size of the uplink data meeting a specified first condition, and
 select a value larger among the first RLC retransmission time and the second RLC retransmission time as a reference RLC retransmission time.

4. The electronic device of claim 3, wherein the communication processor is configured to configure the size of the area for storing the data in the communication buffer based on the reference RLC retransmission time and the uplink transmission rate.

5. The electronic device of claim 1, wherein the communication processor is configured to estimate the uplink transmission rate based on a number of Protocol Data Units (PDUs) transmitted through an uplink for a specified time and a size of PDUs.

6. The electronic device of claim 1, wherein the communication processor is configured to configure at least one of an upper limit reference or a lower limit reference of the communication buffer based on the RLC retransmission time and the uplink transmission rate.

7. The electronic device of claim 6, wherein the communication processor is configured to transmit information on data transmission suspend to the application processor based on an amount of data stored in the communication buffer meeting the upper limit reference.

8. The electronic device of claim 7, wherein the communication processor is configured to identify a data reception rate from the application processor based on the amount of data stored in the communication buffer not meeting the upper limit reference, and
 transmit the information on the data transmission suspend to the application processor based on the data reception rate meeting a second condition.

9. The electronic device of claim 7, wherein the communication processor is configured to transmit information related to data transmission resume to the application processor based on an amount of data stored in the communication buffer meeting the lower limit reference in the state in which data transmission of the application processor is suspended.

10. The electronic device of claim 9, wherein the communication processor is configured to identify an occupancy rate of an RLC buffer based on the amount of data stored in the communication buffer not meeting the lower limit reference in a state in which data transmission by the application processor is suspended, and
 transmit the information related to the data transmission resume to the application processor based on the data occupancy rate of the RLC buffer meeting a specified third condition.

11. A method of operating an electronic device, the method comprising:
 identifying a Radio Link Control (RLC) retransmission time by a communication processor comprising a communication buffer;
 identifying an uplink transmission rate; and
 configuring a size of an area for storing data in the communication buffer based on the RLC retransmission time and the uplink transmission rate.

12. The method of claim 11, wherein the RLC retransmission time is acquired from a Radio Resource Control (RRC) control message.

13. The method of claim 11, wherein the identifying of the RLC retransmission time comprises:
 identifying a size of uplink data based on dual connectivity of first wireless communication and second wireless communication being supported;
 identifying a first RLC retransmission time of the first wireless communication and a second RLC retransmission time of the second wireless communication based on the size of the uplink data meeting a specified first condition; and
 configuring the RLC retransmission time based on the first RLC retransmission time and the second RLC retransmission time.

14. The method of claim 13, wherein the configuring of the RLC retransmission time comprises selecting a value larger among the first RLC retransmission time and the second RLC retransmission time as the reference RLC retransmission time.

15. The method of claim 11, wherein the uplink transmission rate is estimated based on a number of Protocol Data Units (PDUs) transmitted through an uplink for a specified time and a size of PDUs.

16. The method of claim 11, wherein the configuring of the size of the area for storing the data in the communication buffer comprises configuring at least one of an upper limit reference or a lower limit reference of the communication buffer based on the RLC retransmission time and the uplink transmission rate.

17. The method of claim 16, further comprising transmitting information on data transmission suspend to the application processor based on an amount of data stored in the communication buffer meeting the upper limit reference.

18. The method of claim 17, further comprising:
 identifying a data reception rate from the application processor based on the amount of data stored in the communication buffer not meeting the upper limit reference; and
 transmitting the information on the data transmission suspend to the application processor based on the data reception rate meeting a second condition.

19. The method of claim 17, further comprising transmitting information related to data transmission resume to the application processor based on an amount of data stored in the communication buffer meeting the lower limit reference in the state in which data transmission of the application processor is suspended.

20. The method of claim 19, further comprising:
 identifying an occupancy rate of an RLC buffer based on the amount of data stored in the communication buffer not meeting the lower limit reference in a state in which data transmission by the application processor is suspended; and
 transmitting the information related to the data transmission resume to the application processor based on the data occupancy rate of the RLC buffer meeting a specified third condition.

* * * * *